(12) United States Patent
Tokumo et al.

(10) Patent No.: US 9,334,952 B2
(45) Date of Patent: May 10, 2016

(54) SHIFT CONTROL DEVICE FOR VEHICLE

(71) Applicant: MAZDA MOTOR CORPORATION, Hiroshima (JP)

(72) Inventors: Masayuki Tokumo, Hiroshima (JP); Yoh Yamazaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/628,646

(22) Filed: Feb. 23, 2015

(65) Prior Publication Data
US 2015/0267807 A1 Sep. 24, 2015

(30) Foreign Application Priority Data
Mar. 24, 2014 (JP) ................................ 2014-059739

(51) Int. Cl.
| F16H 59/04 | (2006.01) |
| F16H 61/02 | (2006.01) |
| F16H 59/08 | (2006.01) |
| F16H 59/02 | (2006.01) |

(52) U.S. Cl.
CPC ............ *F16H 61/0213* (2013.01); *F16H 59/08* (2013.01); *F16H 2059/0295* (2013.01); *F16H 2059/081* (2013.01); *F16H 2059/082* (2013.01); *F16H 2059/084* (2013.01); *F16H 2059/085* (2013.01); *F16H 2061/0244* (2013.01)

(58) Field of Classification Search
None
See application file for complete search history.

(56) References Cited

U.S. PATENT DOCUMENTS

| 2,077,838 | A | * | 4/1937 | Hughes | B60W 10/06 477/165 |
| 3,795,157 | A | * | 3/1974 | Campbell | B60W 30/18181 477/165 |
| 4,104,982 | A | * | 8/1978 | Hegemann | F16H 59/04 116/28.1 |
| 4,763,100 | A | * | 8/1988 | Wood | G05G 9/047 338/128 |
| 6,080,941 | A | * | 6/2000 | Yokobori | G05G 9/047 200/4 |
| 6,429,849 | B1 | * | 8/2002 | An | G05G 9/047 345/161 |
| 7,227,090 | B2 | * | 6/2007 | Kakuno | G05G 9/047 200/329 |
| 8,901,443 | B2 | * | 12/2014 | Baker | G06F 3/0362 200/17 R |
| 2013/0220055 | A1 | * | 8/2013 | Curl | F16H 59/08 74/473.33 |
| 2015/0185757 | A1 | * | 7/2015 | Jantke | G05G 9/04792 74/471 XY |

FOREIGN PATENT DOCUMENTS

| JP | 2010-105621 A | 5/2010 | | |
| JP | 2010-105623 A | 5/2010 | | |
| WO | WO 0112505 A1 | * | 2/2001 | ............. B63H 25/02 |
| WO | WO 2007147791 A1 | * | 12/2007 | ......... G05G 9/04737 |

\* cited by examiner

*Primary Examiner* — Dirk Wright
(74) *Attorney, Agent, or Firm* — Studebaker & Brackett PC

(57) ABSTRACT

There are provided an operational member and a body portion supporting the operational member rotatably from a home position and movably in a vehicle longitudinal direction from its rotated position. A shift range is changed to a drive range or a reverse range when the operational member is moved in the vehicle longitudinal direction from the rotated position after the operational member is rotated in a specified direction from the home position. A shift mode is changed to a first mode or a second mode, which have different gear ratios from each other, when the operational member is moved in the vehicle longitudinal direction from the rotated position after the operational member is rotated in an opposite direction to the specified direction from the home position.

19 Claims, 13 Drawing Sheets

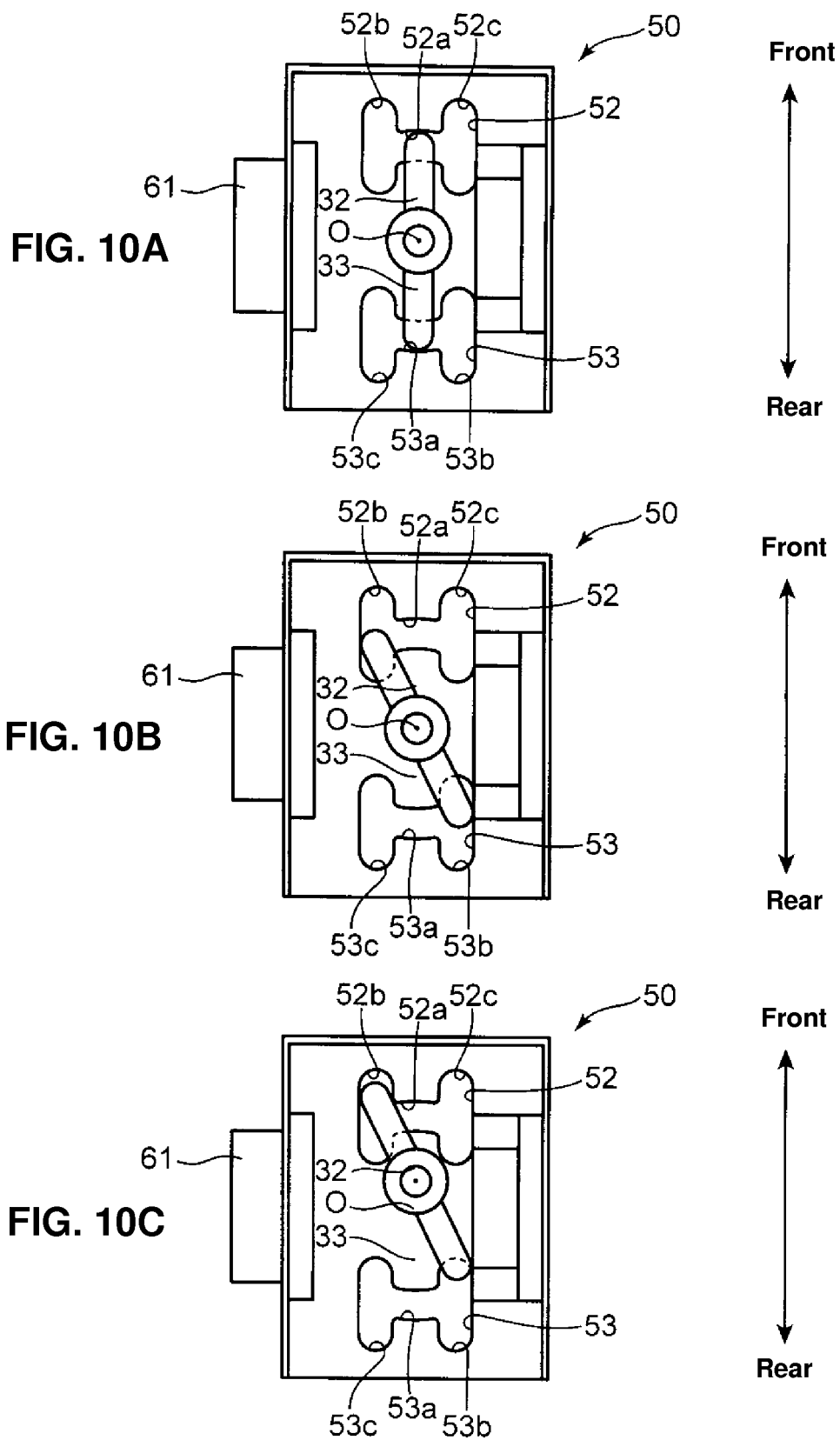

Front ←→ Rear

SHIFT CONTROL DEVICE FOR VEHICLE

BACKGROUND OF THE INVENTION

The present invention relates to a shift control device for a vehicle for changing a shift range of the vehicle.

A so-called electric shifter device, in which a position of an operational member which corresponds to a shift lever is detected electrically for shifting, is known as a shift control device for a vehicle. This electric shifter device has been widely used in electric vehicles or hybrid vehicles which do not have a mechanical transmission. However, the electric shifter device which does not require a mechanical connection between the operational member and the transmission is superior in design flexibility, so that there is a tendency that vehicles provided with the mechanical transmission, such as conventional vehicles which install an engine (internal combustion engine) only as a power source, use the electric shifter device.

In the electric shifter device having less limitation in the operational amount and the operational direction of the operational member, a dial type of operational member in which a traveling range is changed according to rotation and the like of the operational member has been considered from viewpoints of the compactness and the operability. That is, the dial type of operational member can shorten its operational stroke and make its size compact properly, and also since it may be unnecessary for a driver to move a wrist greatly when operating the operational member and the driver may operate the operational member without seeing, the superior operability can be provided. A device disclosed in Japanese Patent Laid-Open Publication No. 2010-105621 is known as an example of the above-described electric shifter device.

In the device of this patent document, a rotatable operational knob is provided, and the shift range is changed to a neutral range when this operational knob is slid along a specified axial line, and also the shift range is changed to a drive range or a reverse range when the operational knob is rotated further from its slid position after the operational knob is slid.

Further, in the electric shifter device, a so-called momentary type of mechanism, that is—a mechanism to return the operational member toward a specified home position automatically as soon as holding of the operational member by a driver's hand is released, has been widely used in order to improve the compactness or the operability. A device disclosed in Japanese Patent Laid-Open Publication No. 2010-105623 is known as an example of this momentary type of electric shifter device.

Specifically, in the device of this patent document, the operational member which can be slid and rotated is provided, and the shift range is changed to the neutral range when the operational member is slid from the home position. When holding of the operational member by a driver's hand is released in this state, the operational member is returned to the home position, keeping the neutral range. Further, when the operational member is further rotated after it is slid from the home position, the shift range is changed to a traveling range (the drive range or the reverse range). When the holding of the operational member by the driver's hand is released in this state, the operational member is returned to the home position, keeping the changed shift range.

There recently exit vehicles in which a shift mode is changeable through a driver's operation of a specified operational member according to driving conditions or driver's requests. For example, some vehicle provided with an engine is configured to have a mode having a relatively small gear ratio to provide a better fuel economy or a mode having a relatively large gear ratio to provide a higher traveling responsiveness, in addition to a normal mode.

Herein, the device of the above-described second patent document is configured to change the shift range (to the neutral/drive/reverse rages) only by operating the operational member. Therefore, there is a problem in that in a case in which the device of the second patent document is applied to the vehicle configured as described above, it may be required to provide another operational member for changing the shift mode, additionally to the operational member for changing the shift range, so that this device may be improperly complex and also the operability of these plural operational members operated by the driver may improperly deteriorate.

SUMMARY OF THE INVENTION

The present invention has been devised in view of the above-described matters, and an object of the present invention is to provide a shift control device for a vehicle which can change the shift range and the shift mode with simple constitution and easy operations.

According to the present invention, there is provided a shift control device for a vehicle, comprising a shift device comprising an operational member provided in a vehicle compartment and a body portion supporting the operational member rotatably from a specified home position and movably in a vehicle longitudinal direction from a rotated position after the operational member is rotated, the body portion being configured to allow the rotated or moved operational member to return to the specified home position automatically, a sensor to detect rotation and move of the operational member of the shift device, and a controller comprising a determination portion to determine a state of the rotation and the move of the operational member detected by the sensor, a range change portion to supply signals for changing a shift range of the vehicle between a drive range for forward traveling and a reverse range for backward traveling to an automatic transmission based on determination results of the determination portion, and a mode change portion to supply signals for changing a shift mode of the vehicle between a first mode and a second mode having a gear ratio which is smaller than that of the first mode to the automatic transmission based on the determination results of the determination portion, wherein the range change portion of the controller is configured to supply a signal for changing the shift range to either one of the drive range and the reverse range to the automatic transmission when the determination portion determines that the operational member is moved forward from the rotated position after the operational member is rotated in a specified direction from the home position, and supply a signal for changing the shift range to the other of the drive range and the reverse range to the automatic transmission when the determination portion determines that the operational member is moved rearward from the rotated position after the operational member is rotated in the specified direction from the home position, and the mode change portion of the controller is configured to supply a signal for changing the shift mode to either one of the first mode and the second mode to the automatic transmission when the determination portion determines that the operational member is moved forward from the rotated position after the operational member is rotated in an opposite direction to the specified direction from the home position, and supply a signal for changing the shift mode to the other of the first mode and the second mode to the automatic transmission when the determination portion determines that the operational member is moved rearward from the rotated position after the operational member is rotated in the opposite direction to the specified direction from the home position.

According to the present invention, the shift range and the shift mode can be changed by operating the common operational member, so that the device can be simpler. Further, the changing of the shift range and the shift mode can be attained with a simple operation of moving the operational member in the vehicle longitudinal direction after the operational member is rotated, so that the superior operability can be obtained.

Moreover, since the present invention is configured such that changing of the drive range or the reverse range is attained by moving the operational member in the vehicle longitudinal direction after its rotation, it can be properly restrained that the shift range is inadvertently changed to the driver range or the reverse range, so that the safety of the vehicle can be ensured. That is, according to the present invention, the changing of the shift range to the drive range or the reverse range is not attained unless the operational member is further moved in the vehicle longitudinal direction after the operational member is rotated from the home position. Accordingly, even if any unexpected force is applied to the operational member because of inadvertent touching of a hand with the operational member or something, it can be properly prevented that the vehicle travels (moves) forward or backward unexpectedly.

According to an embodiment of the present invention, the range change portion of the controller is configured to supply a signal for changing the shift range to a neutral range to the automatic transmission when the determination portion determines that the operational member is rotated in the specified direction from the home position. Thereby, the shift range can be changed to the neutral range with an easy operation of rotating the operational member.

According to another embodiment of the present invention, the mode change portion of the controller is configured to supply a signal for changing the shift mode to a third mode having a gear ratio which is smaller than that of the first mode and larger than that of the second mode to the automatic transmission when the determination portion determines that the operational member is rotated in an opposite direction to the specified direction from the home position. Thereby, the shift mode can be changed to the third mode which is additionally set as a middle mode between the first mode and the second mode.

According to another embodiment of the present invention, the operational member of the shift device is arranged on a right side of a driver seated in a driver's seat, and the specified direction is set to be a counterclockwise direction. Thereby, the direction for attaining the changing of the shift range is set to be the counterclockwise direction that is a direction of rotating the driver's wrist toward the driver's body side, i.e., a direction where the rotatable angle of the wrist is so small that the operation is relatively difficult, in the case of the operational member being arranged on the right side of the driver, whereas the direction for attaining the changing of the shift mode is set to be the clockwise direction that is a direction where the operation is relatively easy in the case of the operational member being arranged on the right side of the driver. Accordingly, the operability of the shift-mode changing can be improved and also it can be restrained that the shift range is changed erroneously.

According another different embodiment of the present invention, the operational member of the shift device is arranged on a left side of a driver seated in a driver's seat, and the specified direction is set to be a clockwise direction. Thereby, the direction for attaining the changing of the shift range is set to be the clockwise direction that is a direction of rotating the driver's wrist toward the driver's body side, i.e., a direction where the rotatable angle of the wrist is so small that the operation is relatively difficult, in the case of the operational member being arranged on the left side of the driver, whereas the direction for attaining the changing of the shift mode is set to be the counterclockwise direction that is a direction where the operation is relatively easy in the case of the operational member being arranged on the left side of the driver. Accordingly, the operability of the shift-mode changing can be improved and also it can be restrained that the shift range is changed erroneously.

Further, in the present invention, it may be preferable that the range change portion of the controller be configured to supply a signal for changing the shift range to the reverse range to the automatic transmission when the determination portion determines that the operational member is moved forward from the rotated position after the operational member is rotated, and supply a signal for changing the shift range to the drive range to the automatic transmission when the determination portion determines that the operational member is moved rearward from the rotated position after the operational member is rotated, and/or that the mode change portion of the controller be configured to supply a signal for changing the shift mode to the first mode when the determination portion determines that the operational member is forward from the rotated position after the operational member is rotated, and supply a signal for changing the shift mode to the second mode to the automatic transmission when the determination portion determines that the operational member is moved rearward from the rotated position after the operational member is rotated. Thereby, the driver can be made to easily recognize the operational direction for changing the shift range and/or the shift modes, so that the superior operability can be ensured.

That is, a conventional automatic-transmission vehicle is configured such that a shift-lever position corresponding to the reverse range is arranged forward of a shift-lever position corresponding to the drive range. Therefore, the above-described setting of the operational direction of changing to the reverse range to be the forward direction matches the conventional arrangement, so that the driver can operate the shift changing to the reverse range and the drive range smoothly without having inappropriate feelings. Meanwhile, when the shift mode is changed to the first mode having the large gear ratio during vehicle traveling, the vehicle tends to decelerate, so that a forward force acts on the driver. Therefore, the above-described setting of the operational direction of changing to the first mode to be the forward direction can match the operational direction with the driver's feelings, so that the superior operability can be obtained.

According to another embodiment of the present invention, the body portion of the shift device is configured to support the operational member such that an operational force necessary for the operational member to be rotated in the specified direction from the home portion is larger than an operational force necessary for the operational member to be rotated in the opposite direction to the specified direction from the home position. Thereby, it becomes relatively difficult to rotate the operational member in the specified direction for changing the shift range, so that the driver can be made to recognize properly that the current operational direction is the direction for changing the shift range. Accordingly, it can be restrained that the vehicle travels forward or backward unexpectedly because of the driver's erroneous shift-range changing, and also it can be prevented surely that the shift range is changed inadvertently which may caused by an unexpected force being applied to the operational member because of inadvertent touching of something or the like. Further, the operation for changing the shift mode becomes relatively easy, so that the operability of the shift-mode changing during the vehicle traveling or the like can be improved.

Herein, it may be configured as another embodiment such that the body portion of the shift device is configured to support the operational member such that an operational force necessary for the operational member to be rotated in the specified direction from the home portion is smaller than an operational force necessary for the operational member to be rotated in the opposite direction to the specified direction from the home position. Thereby, it becomes relatively difficult to change the shift mode, so that the driver can be made to recognize properly that the current operational direction is the direction for changing the shift mode. Accordingly, the driver can be restrained from changing the shift mode erroneously, and also it can be prevented surely that the shift mode is changed inadvertently which may caused by an unexpected force being applied to the operational member because of inadvertent touching of a hand or the like. Further, in the present embodiment, the operation for changing the shift range which may happen relatively frequently becomes easy, so that the operability of the shift-range changing can be improved.

Other features, aspects, and advantages of the present invention will become apparent from the following description which refers to the accompanying drawings.

BRIEF DESCRIPTION OF THE DRAWINGS

FIG. 9A showing a state of the shift device located at a home position; FIG. 9B showing a state of the shift device rotated counterclockwise from the home position; and FIG. 9C showing a state of the shift device slid forward after a rotation.

FIGS. 10A, 10B and 10C are plan views showing an inside of a body portion of the shift device in different states: FIG. 10A showing a state in which a dial of the shift device is located at the home position; FIG. 10B showing a state in which the dial is rotated counterclockwise from the home position; and FIG. 10C showing a state in which the dial is slid forward after the rotation.

FIG. 11A showing the state in which the dial of the shift device is located at the home position; FIG. 11B showing the state in which the dial is rotated counterclockwise from the home position; and FIG. 11C showing the state in which the dial is slid forward after the rotation.

FIG. 13A showing the state in which the dial of the shift device is located at the home position; FIG. 13B showing the state in which the dial is rotated counterclockwise from the home position; and FIG. 13C showing the state in which the dial is slid forward after the rotation.

FIG. 16A showing a state in which the hand holds the dial located at the home position; and FIG. 16B showing a state in which the hand rotates the dial from the home position.

DETAILED DESCRIPTION OF THE INVENTION

Hereinafter, a preferred embodiment of the present invention will be described specifically referring to the accompanying drawings.

[Entire Structure]

Figure 1:
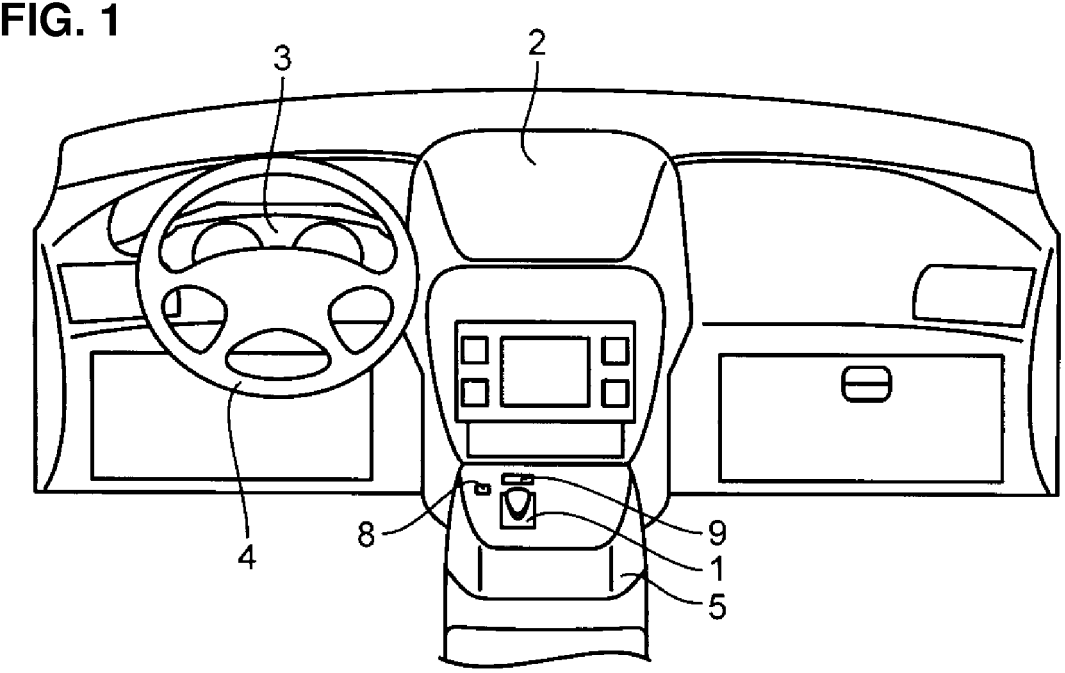
FIG. 1 is a diagram showing a structure of a vehicle-compartment front portion of a vehicle which is equipped with a shift device of a shift control device according to an embodiment of the present invention.

FIG. 1 is a diagram showing a structure of a vehicle-compartment front portion of a vehicle which is equipped with a shift device of a shift control device according to an embodiment of the present invention. As shown in FIG. 1, a vehicle according to the present embodiment is a so-called left-handle vehicle in which a driver's seat and a steering wheel 4 are provided on a left side of the vehicle. An instrument panel 2 which extends in a vehicle width direction is provided at a vehicle-compartment front portion as shown in the figure. A meter unit 3 is provided on a driver's-seat side of the instrument panel 2, and behind the meter unit 3 is provided the steering wheel 4. A center console 5 is provided at a portion which extends rearward from a central portion, in the vehicle width direction, of the instrument panel 2, and on the center console 5 are provided a shift device 1, a parking switch 8, and an indicator 9 which constitute part of the shift control device for the vehicle according to the present embodiment.

In the present embodiment, the vehicle comprises an engine (not illustrated) which is comprised of an internal combustion engine, such as a gasoline engine or a diesel engine, and an automatic transmission 90 (FIG. 15) which transmits a drive force of the engine to wheels with speed reduction. The automatic transmission 90 is a multi-stage transmission (AT) which includes a planetary gear mechanism and automatically selects an appropriate one among plural speed-reduction ratios which are attained by the planetary gear mechanism according to a vehicle speed, an engine load, and the like. A shift range of the automatic transmission 90 includes a parking range in which a drive-force transmission is shut off, a forward-traveling range, i.e., a drive range, in which the drive force is transmitted so as to make the vehicle travel forward, and a backward-traveling range, i.e., a reverse range, in which the drive force is transmitted so as to make the vehicle travel backward.

Further, the above-described automatic transmission 90 is configured such that plural shift modes having different speed-reduction ratios (gear ratios) from each other. Specifically, as described below, the shift modes are configured to be selectable by the driver, and the automatic transmission 90 is configured such that the speed-reduction ratios are selectable according to the selected modes additionally to a vehicle speed and an engine load.

In the present embodiment, three modes, i.e., a normal mode (a third mode), a sport mode (a first mode), and an economy mode (a second mode), are set as the above-described shift mode.

The normal mode is a standard mode and configured such that the vehicle-traveling performance and the fuel-economy performance are ensured to some extent. The sport mode is a mode which provides the relatively-high vehicle-traveling performance, and configured such that its speed-reduction ratio is set to be relatively large, compared to the normal mode, so as to obtain a higher torque. The economy mode is a mode which provides the relatively-high fuel-economy performance, and configured such that its speed-reduction ratio is set to be relatively small, compared to the normal mode. In the present embodiment, the speed-reduction ratios are set to be different from each other in the modes for all driving conditions. Alternatively, it may be configured such that the speed-reduction ratios are different from each other in the modes only for part of all driving conditions. For example, it may be configures such that the speed-reduction ratio changes in plural stages according to the vehicle speed, and the driving conditions, such as the vehicle speed and others, for changing the speed-reduction ratio are set to be different, so that the speed-reduction ratios for a specified driving condition are the same regardless of the kind of modes, whereas the speed-reduction ratios for a specified driving condition are different from each other according to the kind of modes.

The parking switch 8 is a switch to be operated when the shift range of the automatic transmission 90 is changed to the parking range. In an example shown in FIG. 1, the parking switch 8 is a push-type of button switch in which selection/non-selection of the parking range is switched each time the parking switch 8 is pushed. A letter plate with "P" which means the parking range is provided on an upper face of the parking switch 8, and when the parking range is selected, the letter "P" is indicted noticeably by a light source, such as LED.

The shift device 1 is a device to be operated when the shift range of the automatic transmission 90 is changed to any other range than the parking range (i.e., the drive range, the reverse range, or the neutral range) and the shift mode is changed. The shift device 1 is configured to be rotated or slid (moved) in the vehicle longitudinal direction from its rotated position, which will be described specifically later. The shift range of the automatic transmission 90 is changed to either one of the drive range, the reverse range, and the neutral range according to operational patterns applied to the shift device 1, and also the shift mode is changed to either one of the normal mode, the sport mode, and the economy mode.

Figure 2:
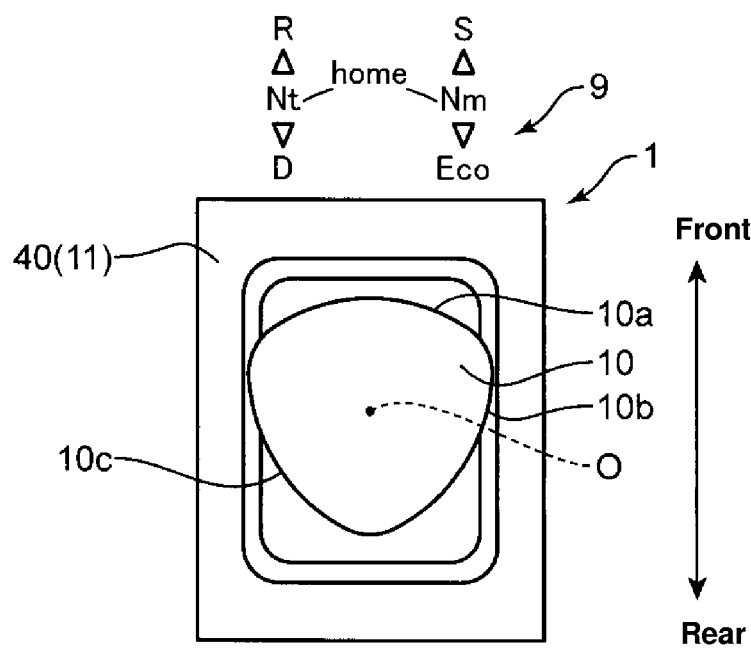
FIG. 2 is a plan view of the shift device and its surrounding portion.

The indicator 9 indicates the shift range selected currently among the drive range, the reverse range, and the neutral range. FIG. 2 is an enlarged plan view showing the shift device 1 and its surrounding portion. In the case of the indicator 9 exemplified in FIG. 2, there is provided a letter plate with "R" which means the reverse range, "Nt" which means the neutral range, "D" which means the drive range, "S" which means the sport mode, "Nm" which means the normal mode, and "Eco" which means the economy mode. When any of the drive range, the reverse range, and the neutral range is selected through the operation of the shift device 1, the letter corresponding to this selected range (any of "R", "Nt" and "D") is indicated noticeably, and also when any of the normal mode, the sport mode, and the economy mode is selected through the operation of the shift device 1, the letter corresponding to this selected mode (any of "S", "Nm" and "Eco") is indicated noticeably. Herein, the letter of "home" shown in FIG. 2 means that a home position of a dial 10 is located at this position.

In addition to the indication of the shift range and the shift mode by means of the indicator 9, the shift range and the shift mode are indicated at the meter unit 3 in the example shown in FIG. 1. That is, the meter unit 3 includes, at a specified position (between a vehicle-speed meter and an engine-speed meter, for example), an indication portion which is comprised of a liquid-crystal screen or the like, and the letter ("P", "R", "Nt", "D") corresponding to the selected shift range and the letter ("S", "Nm", "Eco") corresponding to the selected shift mode is indicated on this indication portion.

Figure 3:
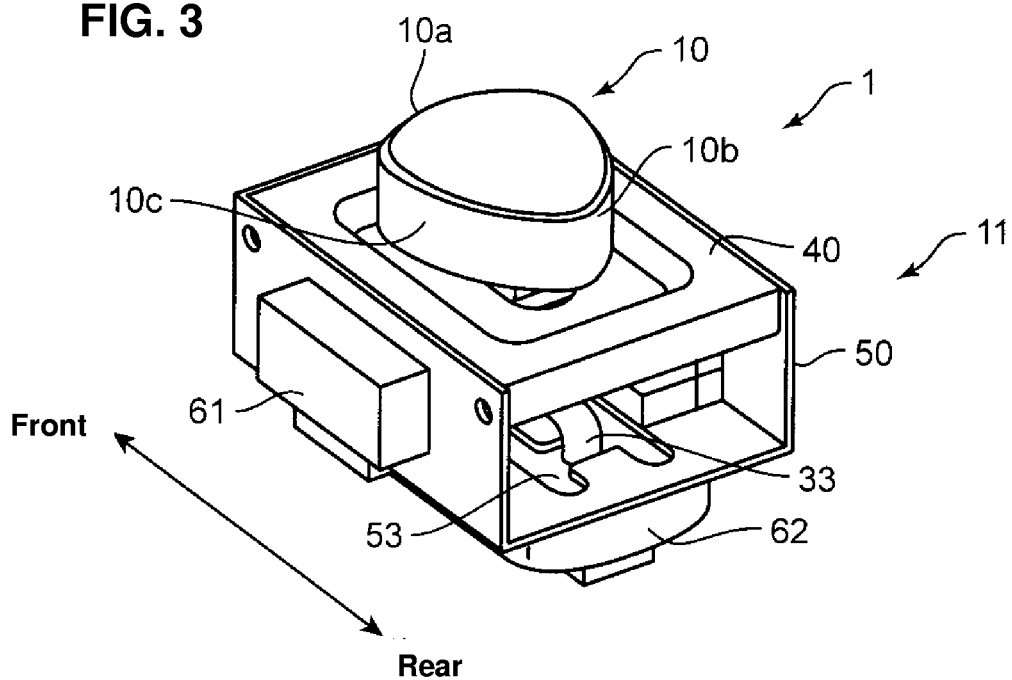
FIG. 3 is a perspective view of the shift device.
Figure 4:
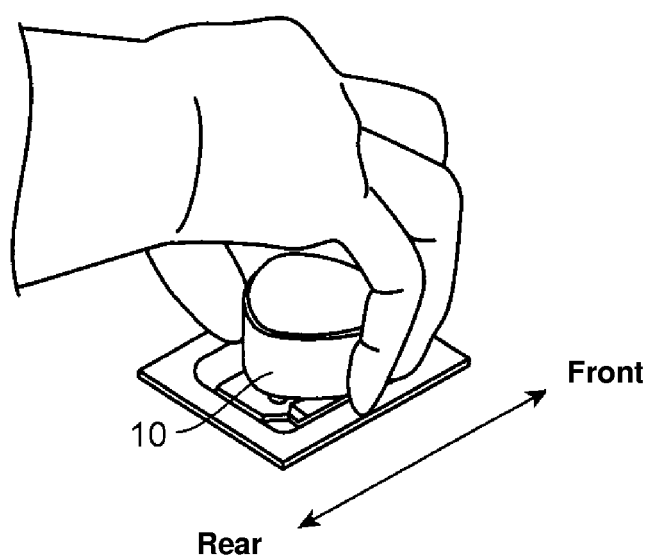
FIG. 4 is a diagram showing an operational example of the shift device.
Figure 5:
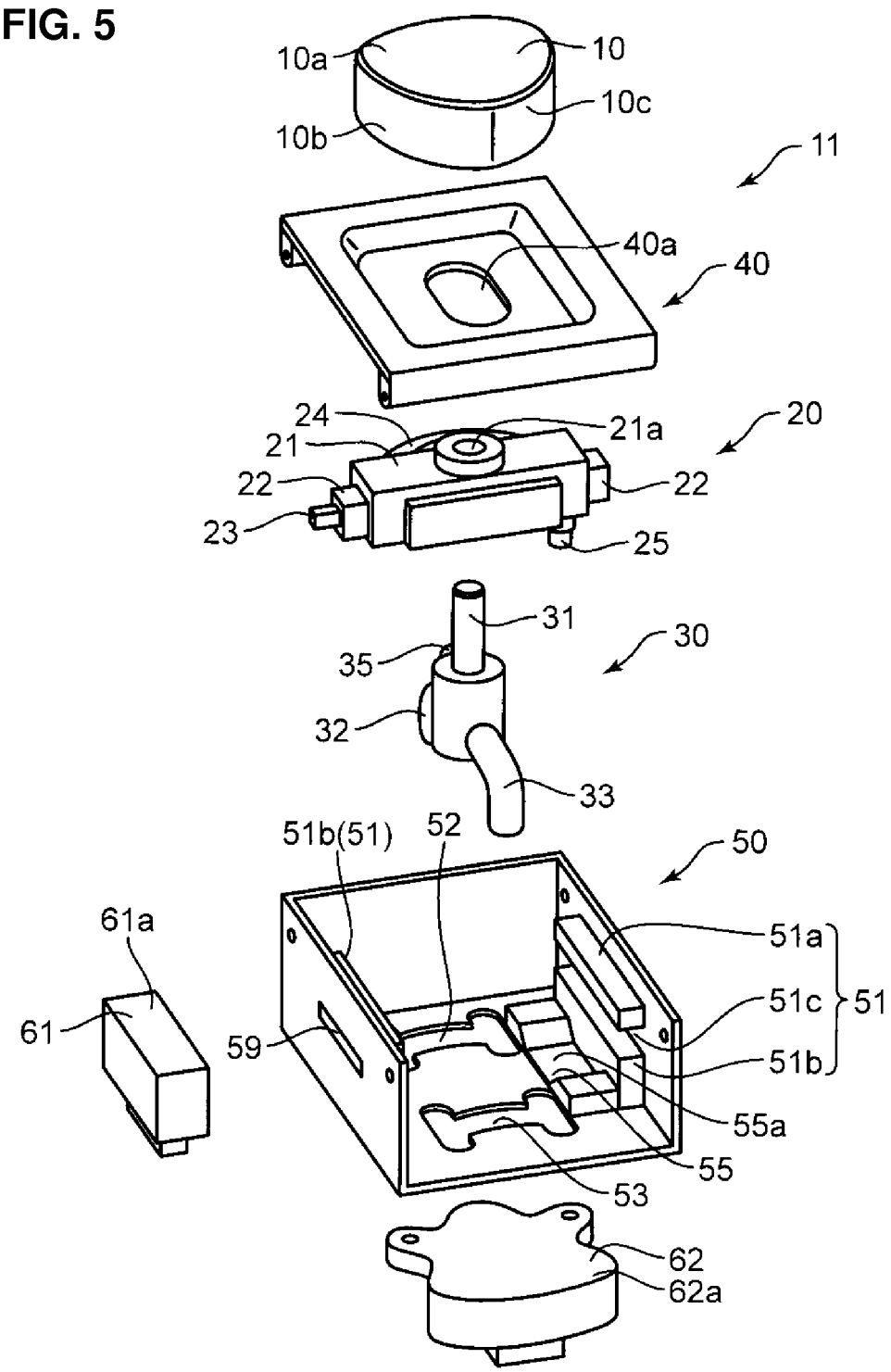
FIG. 5 is an exploded perspective view of the shift device.
Figure 6:
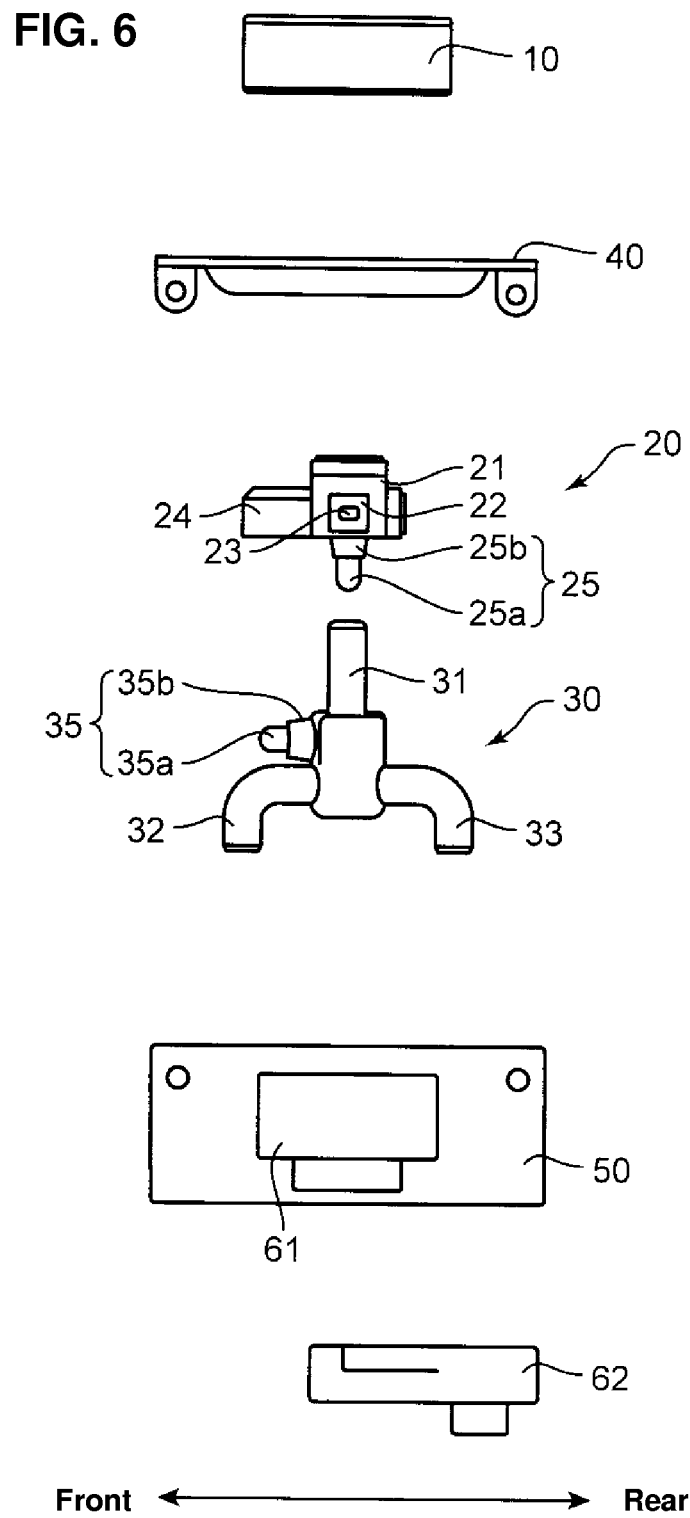
FIG. 6 is an exploded side view of the shift device.
Figure 7:
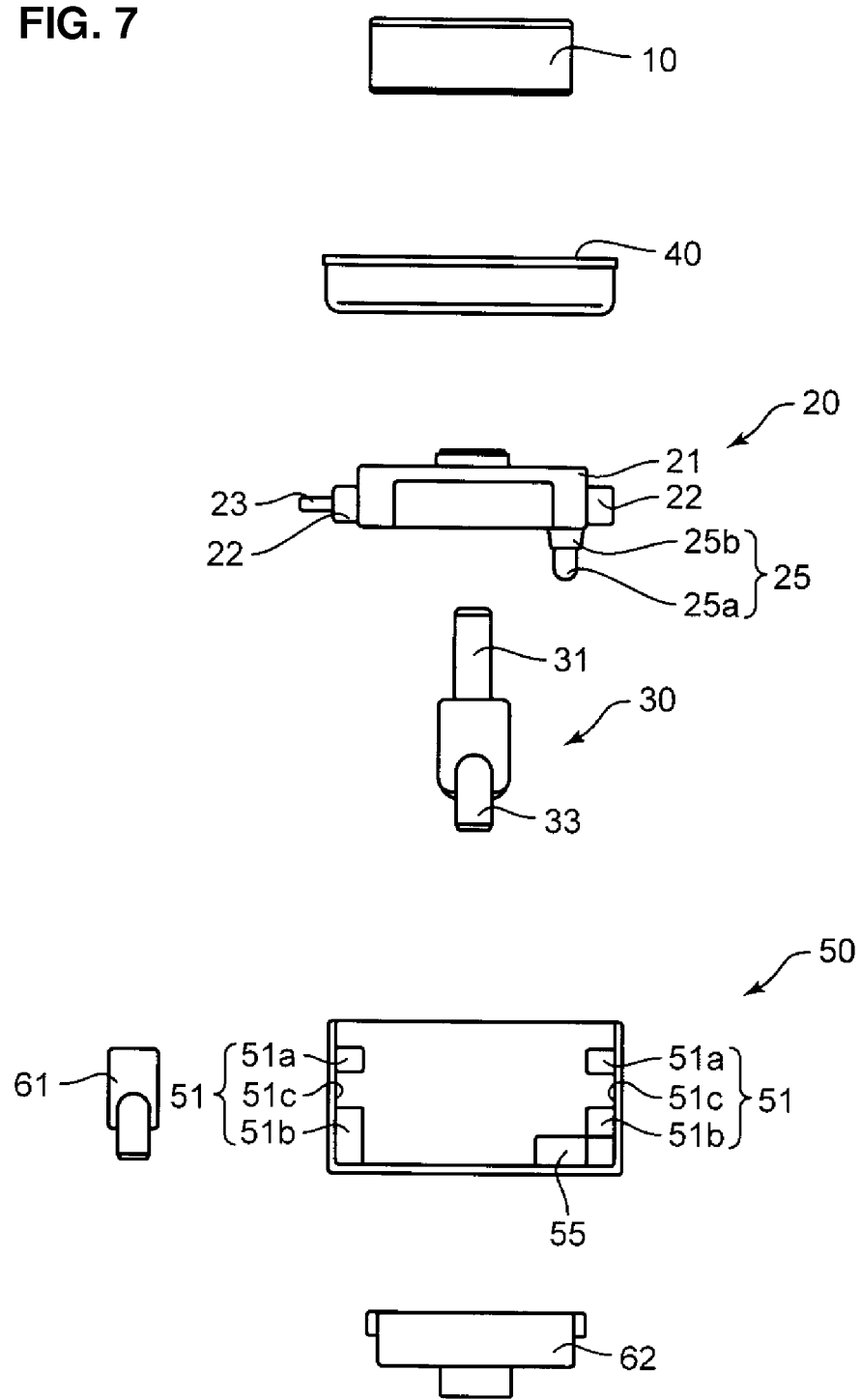
FIG. 7 is an exploded back view of the shift device.

A specific structure of the shift device 1 will be described. FIG. 3 is a perspective view of the shift device 1. FIG. 4 is a diagram showing an operational example of the shift device 1. FIGS. 5-7 are exploded views of the shift device 1.

As shown in these figures and FIG. 2, the shift device 1 comprises the dial (operational member) 10 and a body portion 11 which supports the dial 10 rotatably and sliding-movably in the vehicle longitudinal direction from a rotated position after the dial 10 is rotated. Hereafter, the vehicle longitudinal direction will be referred to as a "longitudinal direction" simply, a front side/forward in this direction will be referred to as a "front side/forward" simply, and a rear side/rearward in this direction will be described to as a "rear side/rearward" simply. Further, in the figures, "Front" means the front side in the vehicle longitudinal direction, and "Rear" means the rear side in the vehicle longitudinal direction.

The dial 10 is a portion to be held by a driver. The dial 10 is supported, having its position shown in FIG. 2 being its home position, rotatably—clockwise (in a right direction) or counterclockwise (in a left direction)—from the home position and sliding-movably in the longitudinal direction from a rotated position after the dial 10 is rotated. In the example shown in FIG. 2, the dial 10 is supported such that it is rotated around its rotational center O.

As shown in FIG. 2, the dial 10 of the present embodiment is configured to be symmetrical relative to a line extending in the longitudinal direction in a state in which the dial 10 is located at the home position. Also, the dial 10 is configured substantially in a regular-triangular shape such that a rear end portion located on its center line is an apex of the triangle. Each side of the regular-triangular shaped dial 10 is configured to protrude outward in a curve shape. That is, the dial 10 includes a front end face 10a which protrudes forward and side faces 10b, 10c which respectively protrude outward and rearward toward its rear end from both ends of the front end face 10a. The driver can hold the dial 10 in a state in which a thumb and a little finger of the driver contact the both side faces 10b, 10c, respectively, as shown in FIG. 4.

As shown in FIGS. 5-7, the body portion 11 comprises a boxy housing 50 which opens upward and a cover portion 40 which is attached to an upper face of the housing 50 so as to cover over its opening portion. The dial 10 is arranged above the cover portion 40. The body portion 11 further comprises a rod 30 which extends downward from the dial 10, penetrating the cover portion 40, and is stored inside the housing 50, and a slide block 20 which is stored in the housing 50.

The rod 30 includes a shaft portion 31 which extends downward from the dial 10, passing through a hole 40a which is formed at the cover portion 40, a leg portion for rotational-side detent 35, and a pair of leg portions for guide 32, 33.

The shat portion 31 of the rod 30 is fixed to a lower face of the dial 10 rotatably and slide-movably together with the lower face of the dial 10, so that the rod 30 can rotate and slide in the longitudinal direction together with the dial 10. In the present embodiment, the shaft portion 31 is fixed to the dial 10 such that a center axis thereof and the center (the rotational center O) of the dial 10 match each other in a plan view, so that the rod 30 rotates around the central axis of the shaft portion 31 together with the dial 10. Herein, the inner diameter of the above-described through hole 40a formed at the cover portion 40 is set to be larger than the outer diameter of the shaft portion 31 of the rod 30 by a specified length so that the rod 30 can rotate and slide in the longitudinal direction. Hereafter, the rotational center of the rod 30 and the dial 10 will be referred to as the "rotational center O" simply in some cases.

The leg portion for rotational-side detent 35 is a bar member which projects horizontally from a middle position, in a vertical direction, of the shaft portion 31. In the present embodiment, the leg portion for rotational-side detent 35 is provided to project straightly forward from the shaft portion 31 in a state in which the dial 10 is located at the home position. The leg portion for rotational-side detent 35 comprises, as shown in FIG. 6 and others, a hollow-shaped leg body portion 35b which extends forward from an outer peripheral face of the shaft portion 31 and a biasing portion 35a which further projects forward from a tip of the leg body portion 35b. The biasing portion 35a is pressed forward by a compressive spring (not illustrated) provided inside the leg body portion 35b. The biasing portion 35a is supported movably in the longitudinal direction relative to the leg body portion 35b such that it moves rearward when receiving a rearward force pushing back the compressive spring but it moves forward when the rearward force decreases.

Each of the leg portions for guide 32, 33 is a bar-shaped member, and these portions 32, 33 project horizontally from respective positions of the outer peripheral face of the shaft portion 31 which face each other, and then extend downward, respectively. In the present embodiment, the leg portions for guide 32, 33 are configured such that in the state in which the dial 10 is located at the home position, the leg portion 32 projects straightly forward from the outer peripheral face of the shaft portion 31 and then extends downward and the leg portion 33 projects straightly rearward from the outer peripheral face of the shaft portion 31 and then extends downward.

The slide block 20 comprises a block-shaped body portion 21, a pair of projection pieces for guide 22, 22 which project outward from a side face of the body portion 21, respectively, a slide-side detection body 23 which further projects outward from one of the projection pieces for guide 22, a leg portion for slide-side detent 25 which projects downward from a lower face of the body portion 21, and a rotational-side guide member 24 which is provided forward of the body portion 21.

The body portion 21 of the slide block 20 has a vertically-penetrating through hole 21a through which the shaft portion 31 of the rod 30 extends. The inner diameter of the through hole 21a is set to be substantially equal to the outer diameter of the shaft portion 31 of the rod 30 such that the shaft portion 31 is rotatable inside the through hole 21a. Therefore, when the rod 30 rotates together with the dial 10, the shaft portion 31 of the rod 30 rotates inside the through hole 21a but the slide block 20 does not rotate. When the rod 30 slides in the longitudinal direction together with the dial 10, the slide block 20 also slides together with the rod 30 and the dial 10. In other words, the rod 30 and the dial 10 are supported at the slide block 20 rotatably around the central axis of the shaft portion 31 of the rod 30 and the center of the dial 10.

In the present embodiment, the body portion 21 of the slide block 20 is substantially of a rectangular-parallelepiped shape which is configured to extend in the vehicle width direction. The projection pieces for guide 22, 22 project outward in the vehicle width direction from both side faces, in the vehicle width direction, of the body portion 21 of the slide block 20, respectively.

The leg portion for slide-side detent 25 has a similar structure to the leg portion for rotational-side detent 35. That is, the leg portion for slide-side detent 25 comprises a hollow-shaped leg body portion 25b which extends downward from the lower face of the body portion 21 of the slide block 20 and a biasing portion 25a which further projects downward from a tip of the leg body portion 25b. The biasing portion 25a is pressed downward by a compressive spring (not illustrated) provided inside the leg body portion 25b. The biasing portion 25a moves upward relative to the leg body portion 25b when receiving an upward force pushing back the compressive spring, but it moves downward when the upward force decreases.

Figure 12:
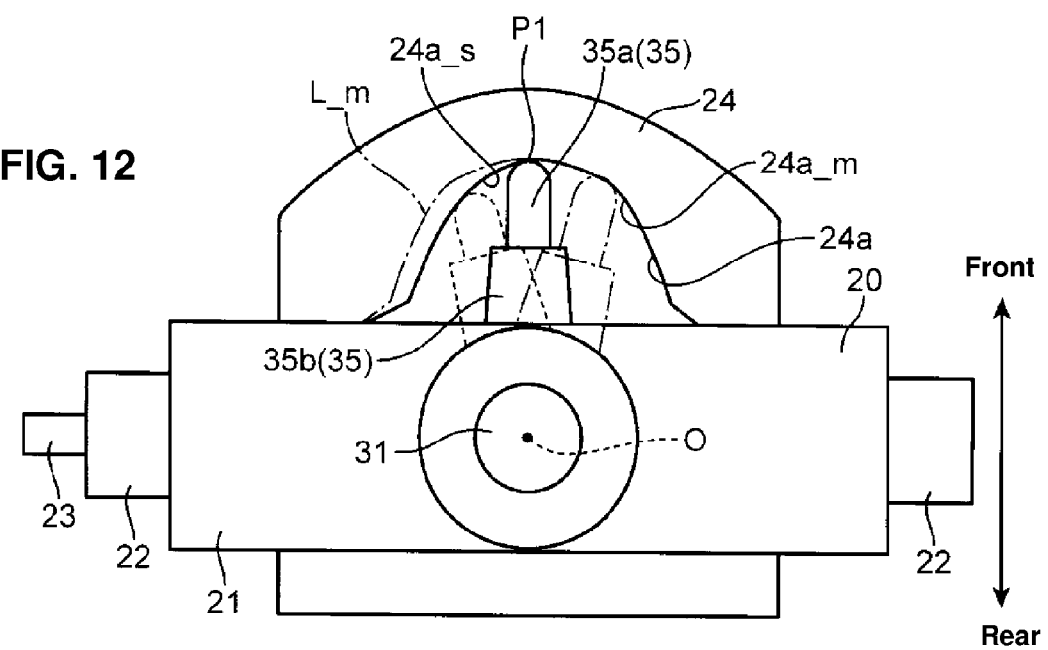
FIG. 12 is an enlarged plan showing a slide block and its surrounding portion.

FIG. 12 is an enlarged plan view showing the slide block 20 and its surrounding portion. As show in FIG. 12, the rotational-side guide member 24 projects forward in an arch shape from a front face of the body portion 21 of the slide block 20, and a specified space is formed between the rotational-side guide member 24 and the body portion 21. The rotational-side guide member 24 has a rotational-side guide face 24a which is concaved forward, facing a front face of the body portion 21. The leg portion for rotational-side detent 35 of the rod 30 is arranged in the space formed between the rotational-side guide member 24 and the body portion 21. In this arrangement state, a tip (front end) of the biasing portion 35a of the leg portion for rotational-side detent 35 is pressed against the rotational-side guide face 24a all the time, receiving a pressing force of the compressive spring. The rotational-side guide face 24a and the leg portion for rotational-side detent 35 constitute a rotational-side momentary mechanism which is configured to return the dial 10 to the home position automatically when the dial 10 is rotated from the home position. Details of the momentary mechanism and the rotational-side guide face 24a will be described later.

A pair of slide-block support portions 51, 51 which support the projection pieces for guide 22, 22 of the slide block 20 sliding-movably in the longitudinal direction, respectively, are formed at both side faces, in the vehicle width direction, of the housing 50. Specifically, each of the slide-block support portions 51, 51 includes guide wall portions 51a, 51b which project inward from a side face of the housing 50 and extend in the longitudinal direction, respectively. These guide wall portions 51a, 51b are spaced apart from each other, and a guide groove 51c which extends in the longitudinal direction is formed between the guide wall portions 51a, 51b. The projection pieces for guide 22, 22 of the slide block 20 are inserted into this guide groove 51c, so that the projection pieces for guide 22, 22 and also the slide block 20 are supported sliding-movably in the longitudinal direction along the guide groove 51c.

A through hole 59 is formed at a bottom face of one of the guide grooves 51c, i.e., at a side face of the housing 50. The slide-side detection body 23 of the slide block 20 is inserted into the through hole 59 such that it projects outward from an outer face of the housing 50. This through hole 59 is of a slot shape which extends in the longitudinal direction so that the slide-side detection body 23 is sliding-movable in the longitudinal direction.

At a bottom face of the hosing 50 are formed rod guide grooves 52, 53 into which the leg portions for guide 32, 33 of the rod 30 are inserted, respectively. The rod 30 is arranged inside the housing 50 such that a lower end portion of the shaft portion 31 contacts the bottom face of the housing 50 in a state in which the leg portions for guide 32, 33 are inserted into the rod guide grooves 52, 53.

Figure 8:
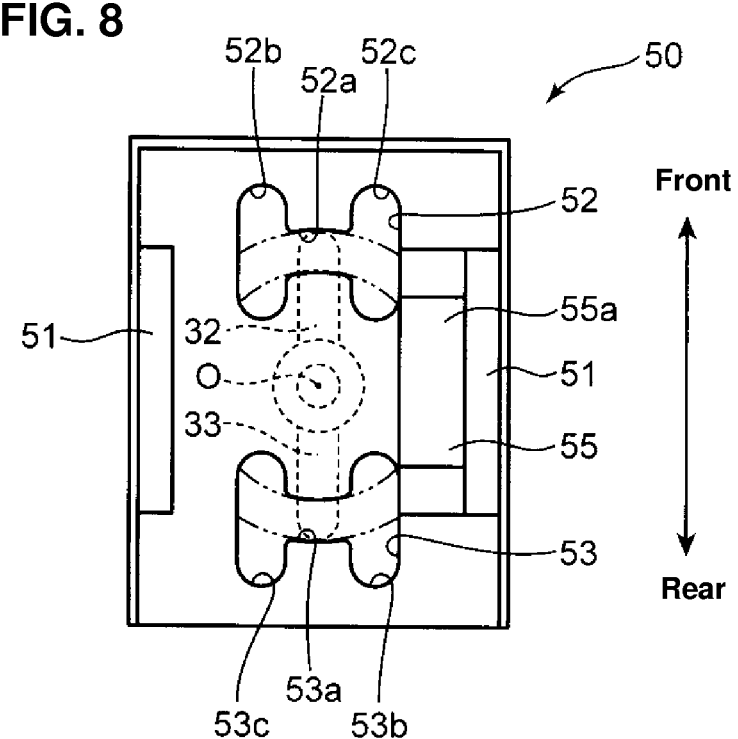
FIG. 8 is a plan view of a housing.

FIG. 8 is a plan view of the housing 50. As shown in this FIG. 8, the rod guide grooves 52, 53 include arc-shaped rotational-side grooves 52a, 53a which extend along a periphery of a circle with the rotational center O in the plan view, and shift-range-side grooves 52b, 53b and shift-mode-side grooves 52c, 53c which are continuous from the rotational-side grooves 52a, 53a and extend longitudinally from both ends of the rotational-side groove 52a, 53a, respectively.

Specifically, the rotational-side grooves 52a, 53a extend from specified positions located on a line extending in the longitudinal direction, passing the rotational center O, clockwise and counterclockwise by the same angle (15°, for example), respectively.

The rod guide groove 52 formed on the front side includes the shift-range-side groove 52b which extends forward from an end portion (left-side end portion) of the counterclockwise direction of the rotational-side groove 52a and the shift-mode-side groove 52c which extends rearward from an end portion (right-side end portion) of the clockwise direction of the rotational-side groove 52a. Meanwhile, the rod guide groove 53 formed on the rear side includes the shift-range-side groove 53b which extends forward from an end portion (right-side end portion) of the counterclockwise direction of the rotational-side groove 53a and the shift-mode-side groove 53c which extends rearward from an end portion (left-side end portion) of the clockwise direction of the rotational-side groove 53a.

Rotational and slide-moving states of the dial 10, the rod 30 and the slide block 20 are shown in FIGS. 9A-9C and 10A-10C.

Figure 9A:
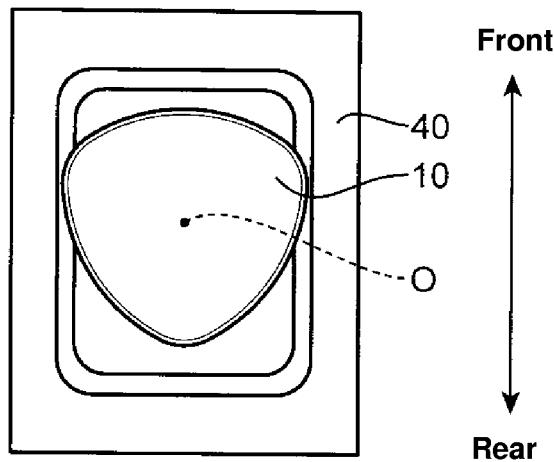
FIGS. 9A, 9B and 9C are plan views of the shift device in different states.
Figure 9B:
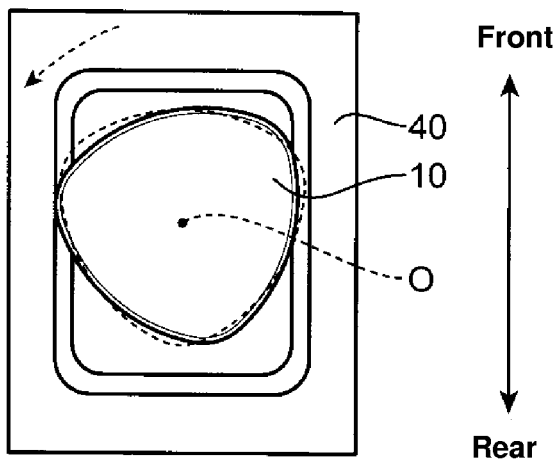
Figure 9C:
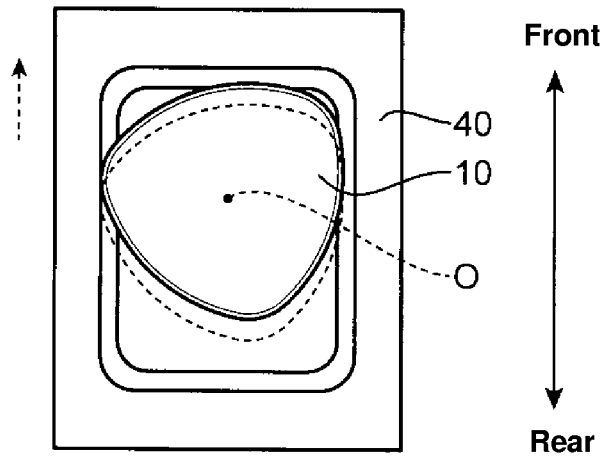

FIGS. 9A-9C show the rotational and slide-moving states of the dial 10. FIGS. 10A-10C shows the states of the rod 30 and the slide block 20, which correspond to FIGS. 9A-9C. FIGS. 9A and 10A show the states in which the dial 10 is located at the home position. As described above, the rod 30 is configured such that the leg portions for guide 32, 33 project straightly forward and rearward from the shaft portion 31 in the state in which the dial 10 is located at the home position.

When the dial 10 is rotated counterclockwise from this state as shown in FIG. 9B, the leg portions for guide 32, 33 move counterclockwise along the rotational-side grooves 52a, 53a of the rod guide grooves 52, 53 as shown in FIG. 10B. If the leg portions for guide 32, 33 contact the end portions of the rotational-side grooves 52a, 53a, the rod 30 and the dial 10 are unable to be rotated further.

When the dial 10 is moved (slid) forward from this state as shown in FIG. 9C, the leg portions for guide 32, 33 move forward along the shift-range-side grooves 52b, 53b of the rod guide grooves 52, 53 as shown in FIG. 10C. Further, the slide block 20 moves forward together with the rod 30. Herein, the projection pieces for guide 22, 22 of the slide block 20 move along the guide groove 51c formed at the housing 50. If the leg portions for guide 32, 33 contact the front ends of the shift-range-side grooves 52b, 53b, the rod 30 and the dial 10 are unable to be moved further.

Meanwhile, when the dial 10 is slid rearward from the state shown in FIG. 9B, the leg portions for guide 32, 33 move rearward along the shift-range-side grooves 52b, 53b of the rod guide grooves 52, 53, and the projection pieces for guide 22, 22 slide along the guide groove 51c and the slide block 20 moves rearward. When the leg portions for guide 32, 33 contact the rear ends of the shift-range-side grooves 52b, 53b, the rod 30 and the dial 10 are prevented from moving further.

Further, when the dial 10 is rotated clockwise from the state shown in FIG. 9A in which the dial 10 is located at the home position, the leg portions for guide 32, 33 move clockwise along the rotational-side grooves 52a, 53a of the rod guide grooves 52, 53. When the leg portions for guide 32, 33 contact clockwise-side end portions (left-side end portions) of the rotational-side grooves 52a, 53a, the rod 30 and the dial 10 are unable to be moved further.

When the dial 10 is slid forward from this state, the leg portions for guide 32, 33 move forward along the shift-mode-side grooves 52c, 53c of the rod guide grooves 52, 53, and the projection pieces for guide 22, 22 slide along the guide groove 51c and the slide block 20 moves forward. Meanwhile, when the dial 10 is slid rearward from the state in which the leg portions for guide 32, 33 contact the clockwise-side end portions (the left-side end portions) of the rotational-side grooves 52a, 53a, the leg portions for guide 32, 33 move rearward along the shift-mode-side grooves 52c, 53c of the rod guide grooves 52, 53, and the projection pieces for guide 22, 22 slide along the guide groove 51c and the slide block 20 moves rearward.

Returning to FIG. 5, a slide-side guide member 55 is provided at a position of the housing 50 which faces the leg portion for slide-side detent 25 of the slide block 20. At an upper face of the slide-side guide member 55 is formed a slide-side guide face 55a which is concaved downward and substantially hemisphere-shaped in a side view. A tip portion of the leg portion for slide-side detent 25, i.e., a tip of the biasing portion 25a is pressed against the slide-side guide face 55a all the time. The slide-side guide face 55a and the leg portion for slide-side detent 25 constitute a slide-side momentary mechanism which is configured to return the dial 10 and the rod 30 to the home positions automatically when the dial 10 and the rod 30 are moved in the longitudinal direction from the home positions. Details of the momentary mechanism and the slide-side guide face 55a will be described later.

As shown in FIGS. 3, 5 and others, a move-amount sensor 61 to detect the amount of move, in the longitudinal direction, of the dial 10 is provided at a side face of the housing 50 which has the through hole 59. Specifically, the move-amount sensor 61 detects the amount of move, in the longitudinal direction, of the slide-side detection body 23 which is provided at the slide block 20 moving together with the dial 10 as a longitudinal move amount of dial 10. The slide-side detection body 23 is stored in a housing 61a of the move-amount sensor 61, and the position of the slide-side detection body 23 is detected by a sensor portion (not illustrated) provided in the housing 61a.

Further, at a lower face of the housing 50 is provided a rotational-amount sensor 62 to detect the amount of rotation of the dial 10. Specifically, the rotational-amount sensor 62 detects the amount of rotation of the leg portion for guide 33 of the rod 30 which rotates together with the dial 10 as a rotational amount of the dial 10. A tip of the leg portion for guide 33 is inserted into a housing 62a of the rotational-amount sensor 62, and the amount of rotation of the leg portion for guide 33 is detected by a sensor portion (not illustrated) provided in the housing 62a.

[Detailed Constitution of Momentary Mechanism]

First, the rotational-side momentary mechanism and the rotational-side guide face 24a will be described.

Figure 11A:
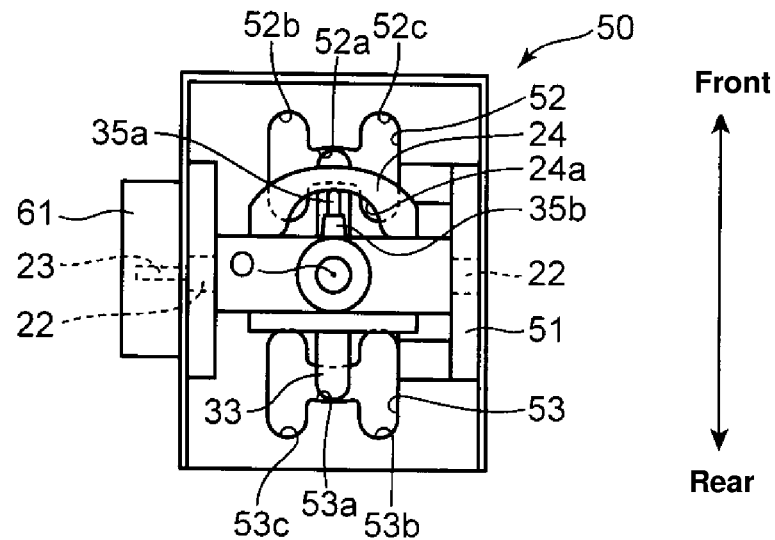
FIGS. 11A, 11B and 11C are plan views showing the inside of the body portion of the shift device in the different states.
Figure 11B:
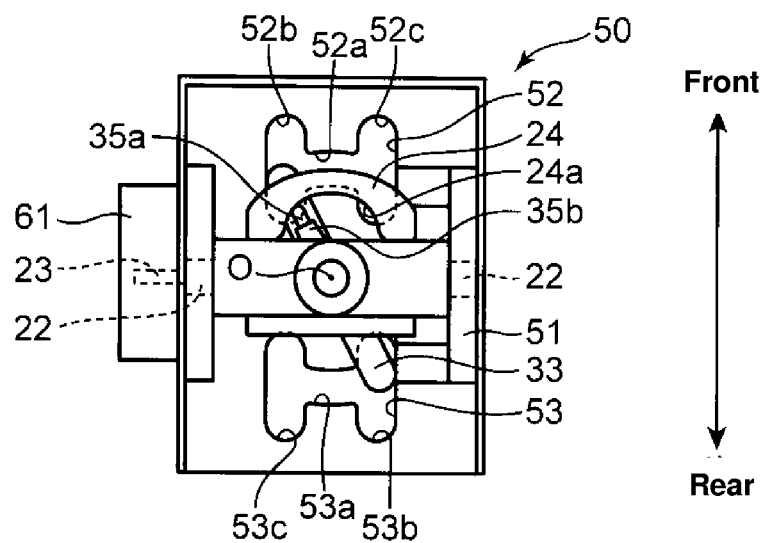
Figure 11C:
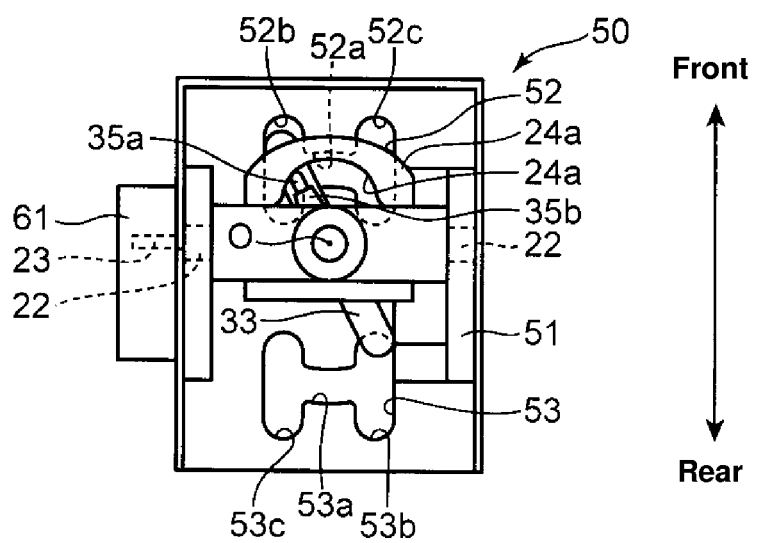

FIGS. 11A-11C correspond to FIGS. 9A-9C and FIGS. 10A-10C and show the states of the leg portion for rotational-side detent 35 when the dial 10 is rotated and slid. As shown in FIGS. 11A and 11B and described above, the slide block 20 is not moved when the dial 10 is rotated. Accordingly, the leg portion for rotational-side detent 35 rotates around the rotational center O along the rotational-side guide face 24a.

The rotational-side guide face 24a is configured to curve such that its front end P1 is located on the line which extends straightly forward, passing the rotational center O as shown in FIG. 12. The rotational-side guide face 24a has a shift-mode-side curve face 24a_m which is positioned on the clockwise side (right side) from the front end P1 and a shift-range-side curve face 24a_s which is positioned on the counterclockwise side (left side) from the front end P1. As shown in FIG. 11A and described above, the leg portion for rotational-side detent 35 is configured to project straightly forward from the shaft portion 31 in the state in which the dial 10 is located at the home position, and also configured such that the biasing portion 35a thereof is arranged so as to contact the front end P1 of the rotational-side guide face 24a in this state.

As shown in FIG. 12, the shift-mode-side curve face 24a_m and the shift-range-side curve face 24a_s are configured such that respective distances thereof from the rotational center O become shorter as being further apart from the front end P1. Accordingly, the biasing portion 35a advances the most from the leg body portion 35b in the state of its contacting the front end P1 of the rotational-side guide face 24a, and retreats more as being further apart from the front end P1. Herein, the retreating biasing portion 35a is strongly pressed against the rotational-side guide face 24a by the compressive spring, and its pressing force is transferred to a force to return the biasing portion 35a to the front end P1. Thus, as the biasing portion 35a retreats further, it is pressed by the compressive spring against the rotational-side guide face 24a with a stronger pressing force. This pressing force is transferred to a force to return the biasing portion 35a to the front end P1. Therefore, in a state in which the operational force (the force for rotating the rod 30 and the dial 10) of the driver's hand is not applied to the biasing portion 35a (the rod 30 and the dial 10), the biasing portion 35a is held at the position where the biasing portion 35a contacts the front end P1 of the rotational-side guide face 24a, so that the dial 10 is held at the home position. Then, when applying of the operational force is released after the dial 10 located at the home position is rotated by receiving the operational force and therefore the biasing portion 35a is moved to the position where the biasing portion 35a is apart from the front end P1, the biasing portion 35a is returned by the force of the compressive spring to the position where the basing portion 35a contacts the front end P1, so that the dial 10 is automatically returned to the home position.

In the present embodiment, as shown in FIG. 12, the curvature of the shift-range-side curve face 24a_s is configured to be larger than that of the shift-mode-side curve face 24a_m. That is, in FIG. 12, a line L_m illustrated by a one-dotted broken line is the one which has the same curvature of the shift-mode-side curve face 24a_m, and the shift-range-side curve face 24a_s is located at a position which is closer to the rotational center O than the line L_m.

As described above, reaction forces of the compressive spring are applied to the biasing portion 35a, i.e., the rod 30 and the dial 10, as the biasing portion 35a moves further apart from the front end P1. This reaction force functions as a resistant force against the rotational operation of the dial 10. That is, the driver cannot rotate the dial 10 unless any stronger force than the reaction force of the compressive spring is applied by the driver. And, the reaction force of the compressive spring, i.e., the resistant force, becomes larger as the biasing portion 35a retreats more.

Therefore, since the curvature of the shift-range-side curve face 24a_s is configured to be larger than that of the shift-mode-side curve face 24a_m as described above in the present embodiment, the retreating amount of the biasing portion 35a in the case in which the biasing portion 35a moves along the shift-range-side curve face 24a_s (when the dial 10 is rotated counterclockwise) is larger, so that the operational force necessary to rotate the dial 10 clockwise from the home position is smaller than the operational force necessary to rotate the dial 10 counterclockwise.

Next, the slide-side momentary mechanism and the slide-side guide face 55a will be described.

Figure 13A:
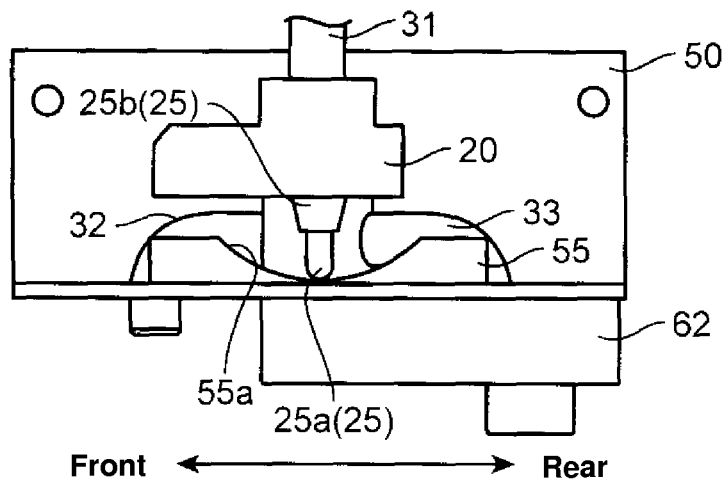
FIGS. 13A, 13B and 13C are side views showing the inside of the body portion of the shift device in the different states.
Figure 13B:
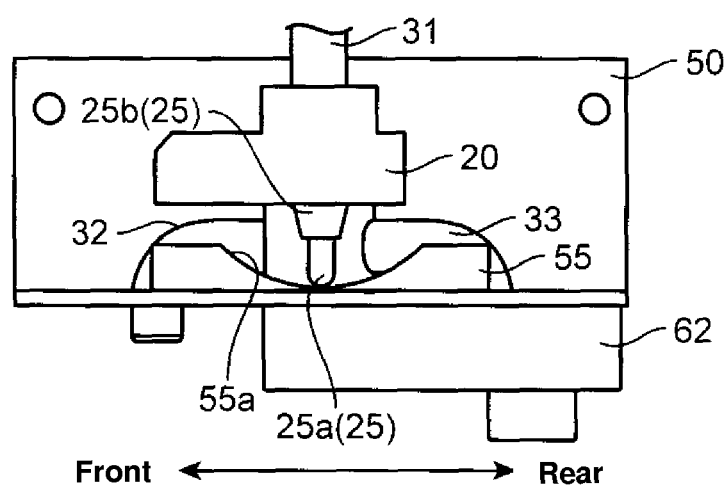
Figure 13C:
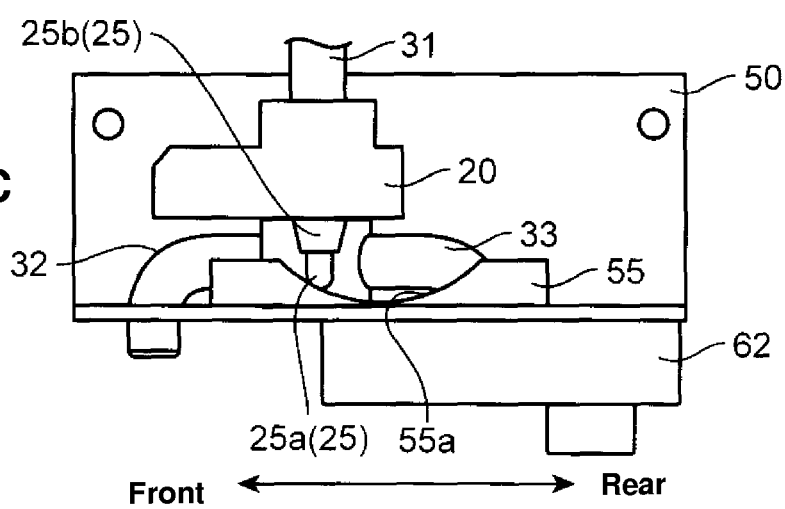
Figure 14:
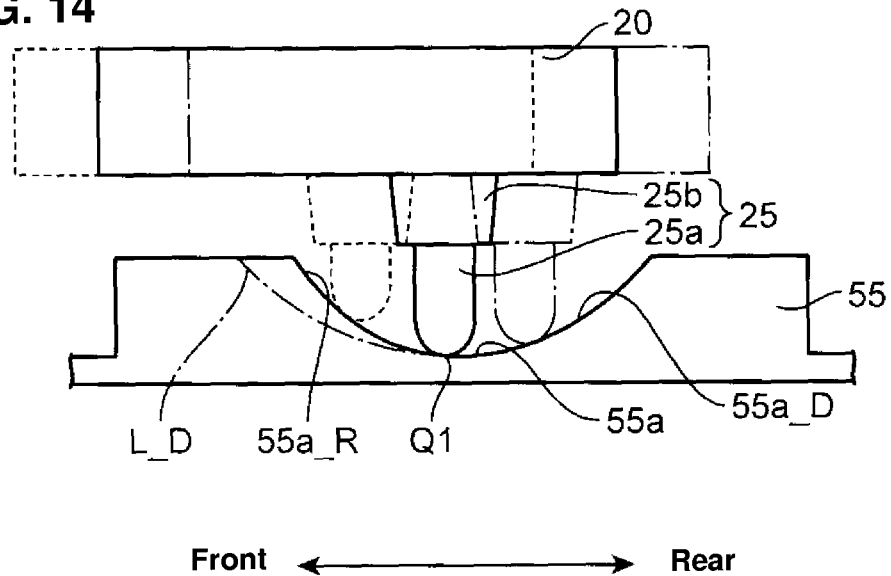
FIG. 14 is a side view describing details of a slide-side guide member.

FIGS. 13A-13C correspond to FIGS. 9A-9C, FIGS. 10A-10C and FIGS. 11A-11C and show the states of the leg portion for slide-side detent 25 when the dial 10 is rotated and slid. FIG. 14 is an enlarged view of the slide-side guide face 55a and the leg portion for slide-side detent 25. As shown in FIGS. 13B and 13C, the leg portion for slide-side detent 25 slides along the slide-side guide face 55a when the dial 10 is slid after the rotation.

As shown in FIG. 14 and described above, the slide-side guide face 55a is concaved downward and substantially hemisphere-shaped in the side view. Further, as shown in FIGS. 13A, 13B and 14, the leg portion for slide-side detent 25 is configured to contact a bottom portion Q1 of the slide-side guide face 55a in a state in which the dial 10 is not slid in the longitudinal direction. Accordingly, the biasing portion 25a of the leg portion for slide-side detent 25 advances the most from the leg body portion 25b in the state of its contacting the bottom portion Q1 of the slide-side guide face 55a, and retreats more as being further apart from the bottom portion Q1. Therefore, in a state in which the operational force (the force for sliding the rod 30 and the dial 10) of the driver's hand is not applied to the biasing portion 25a (the rod 30 and the dial 10), the biasing portion 25a is held at the position where the biasing portion 25a contacts the bottom portion Q1 of the slide-side guide face 55a, so that the dial 10 is held at the home position. Then, when applying of the operational force is released after the dial 10 located at the home position is slid by receiving the operational force and therefore the biasing portion 25a is moved to the position where the biasing portion 25a is apart from the bottom portion Q1, the biasing portion 25a is returned by the force of the compressive spring to the position where the basing portion 25a contacts the bottom portion Q1, so that the dial 10 is automatically returned to the home position. And, the reaction force of the compressive spring applied to the biasing portion 25a functions as the resistant force against the slide move of the dial 10, and this force against the reaction force of the compressive spring becomes the force necessary to slide the dial 10.

In the present embodiment, the slide-side guide face 55a is configured to be linearly symmetrical in the longitudinal direction, that is, symmetrical relative to a line which extends in the vehicle width direction, passing the bottom portion Q1. Therefore, the force necessary to longitudinally move the basing portion 25a from the bottom portion Q1, i.e., the force necessary to longitudinally slide the dial 10 after its rotation, has the same magnitude of force regardless of the longitudinal directions (i.e., forward or rearward).

[Control System]

Figure 15:
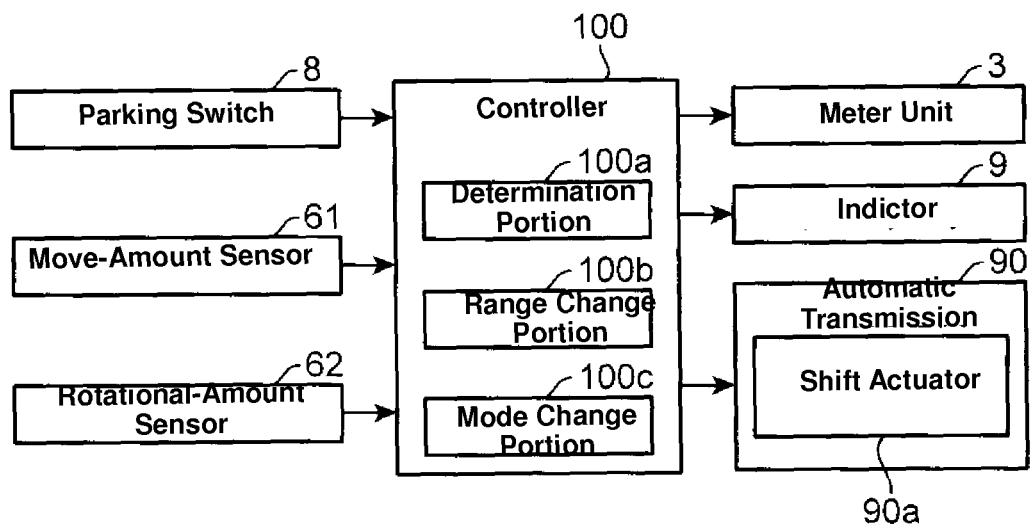
FIG. 15 is a block diagram showing a control system of the shift control device including the shift device and a controller.

FIG. 15 is a block diagram showing a control system of the shift control device of the embodiment, including the shift device 1 and a controller 100. The controller 100 shown in this figure is a microcomputer comprising well-known CPU, RAM, ROM and others, and performs functions of controlling shifting of the automatic transmission 90 according to the operational states of the shift device 1. While the controller 100 is shown as a single and integrated block in FIG. 15, it may be comprised of plural microcomputers which are separately provided on a vehicle-body side and a side of the automatic transmission 90.

The controller 100 is electrically coupled to the above-described parking switch 8, move-amount sensor 61, rotational-amount sensor 62, automatic transmission 90 (a shift actuator 90a provided therein, specifically), indicator 9 and meter unit 3. Herein, the shift actuator 90a of the automatic transmission 90 means solenoid (electromagnetic) valves to switch connection/disconnection of frictional elements stored in the automatic transmission 90, such as clutches or brakes, for example.

The controller 100 functionally includes a determination portion 100a, a range change portion 100b, and a mode change portion 100c.

The determination portion 100a determines operational states of the dial 10. Specifically, the determination portion 100a determines based on a signal from the rotational-amount sensor 62 whether the dial 10 is rotated from the home position or not. Further, the determination portion 100a determines based on a signal from the move-amount sensor 61 whether the dial 10 is moved forward or not and whether the dial 10 is moved rearward or not.

The range change portion 100b performs changing of the shift range of the automatic transmission 90 based on the operation states of the dial 10 determined by the determination portion 100a.

The mode change portion 100c performs changing of the shift mode of the automatic transmission 90 based on the operational states of the dial 10 determined by the determination portion 100a.

When it is determined by the determination portion 100a that the dial 10 is rotated counterclockwise from the home position by a specified amount of rotation, the range change portion 100b changes the shift range to the neutral range. In the present embodiment, the above-described specified rotational amount is set to be almost equal to a rotational amount of the dial 10 which is rotated from the home position to the position where the leg portions for guide 32, 33 of the rod 30 contact the respective counterclockwise-side end portions of the rotational-side grooves 52a, 53a of the rod guide grooves 52, 53.

When it is determined by the determination portion 100a that the dial 10 is slid forward by a specified first amount of slide or more from its counterclockwise rotated position, the range change portion 100b changes the shift range to the reverse range. Meanwhile, when it is determined by the determination portion 100a that the dial 10 is slid rearward by a specified second amount of slide from its counterclockwise rotated position, the range change portion 100b changes the shift range to the drive range. In the present embodiment, the above-described specified first slide amount is set to be almost equal to a slide amount of the leg portions for guide 32, 33 of the rod 30 which slides from the counterclockwise-side end portions of the rotational-side grooves 52a, 53a to the position where the leg portions for guide 32, 33 of the rod 30 contact the front ends of the shift-range-side grooves 52b, 53b. Further, the above-described specified second slide amount is set to be almost equal to a slide amount of the leg portions for guide 32, 33 of the rod 30 which slides from the counterclockwise-side end portions of the rotational-side grooves 52a, 53a to the position where the leg portions for guide 32, 33 of the rod 30 contact the rear ends of the shift-range-side grooves 52b, 53b.

When it is determined by the determination portion 100a that the dial 10 is rotated clockwise from the home position by a specified amount of rotation, the mode change portion 100c changes the shift mode to the normal range. In the present embodiment, the above-described specified rotational amount is set to be almost equal to a rotational amount of the dial 10 which is rotated from the home position to the position where the leg portions for guide 32, 33 of the rod 30 contact the respective clockwise-side end portions of the rotational-side grooves 52a, 53a of the rod guide grooves 52, 53.

Moreover, when it is determined by the determination portion 100a that the dial 10 is slid forward by a specified third amount of slide or more from its rotated position after the dial 10 is rotated clockwise, the range change portion 100b changes the shift mode to the sport mode. Meanwhile, when it is determined by the determination portion 100a that the dial 10 is slid rearward by a specified fourth amount of slide or more from its rotated position after the dial 10 is rotated clockwise, the range change portion 100b changes the shift mode to the economy mode. In the present embodiment, the above-described third slide amount is set to be almost equal to a slide amount of the leg portions for guide 32, 33 of the rod 30 which slides from the clockwise-side end portions of the rotational-side grooves 52a, 53a to the position where the leg portions for guide 32, 33 of the rod 30 contact the front ends of the shift-range-side grooves 52b, 53b. Further, the above-described fourth slide amount is set to be almost equal to a slide amount of the leg portions for guide 32, 33 of the rod 30 which slides from the clockwise-side end portions of the rotational-side grooves 52a, 53a to the position where the leg portions for guide 32, 33 of the rod 30 contact the rear ends of the shift-range-side grooves 52b, 53b.

The controller 100 further performs controls of changing indications of the indicator 9 and the meter unit 3 according to the changing of the shift range and the shift mode (control of indicating the current shift range and shift mode).

[Operations and Others]

As described above, according to the shift control device of the present embodiment, the shift range is changed to the neutral range by the dial 10 being rotated counterclockwise from the home position, the shift range is changed to the reverse range by the dial 10 being slid forward from its rotated position after being rotated counterclockwise, and the shift range is changed to the drive range by the dial 10 being slid rearward from its rotated position after being rotated counterclockwise. Further, the shift mode is changed to the normal mode by the dial 10 being rotated clockwise from the home position, the shift mode is changed to the sport mode by the dial 10 being slid forward from its rotated position after being rotated clockwise, and the shift mode is changed to the economy mode by the dial 10 being slid rearward from its rotated position after being rotated clockwise.

As described above, the present shift control device is configured to attain the shift-mode changing of the normal/sport/economy modes, additionally to the shift-range changing of the neutral/reverse/drive ranges, through the operations of the common dial 10. Accordingly, the present device can be relatively simple and its operation can be relatively easy, compared to the case in which an operational member for changing the shift range and an operational member for changing the shift mode are provided separately.

Further, the present shift control device is configured such that the curvature of the shift-mode-side curve face 24a_m and the curvature of the shift-range-side curve face 24a_s are different from each other, so that the operational forces necessary to rotate the dial 10 are different from each other according to the rotational directions, i.e., between the direction for changing the shift mode and the direction for changing the shift range.

Thereby, the driver can recognize properly whether the operational direction of the dial 10 rotated by the driver is the one for changing the shift mode or to one for changing the shift range, so that it can be restrained that the driver operates the dial 10 erroneously.

Particularly, the curvature of the shift-range-side curve face 24a_s of the present embodiment is configured to be relatively large, so that the operational force to rotate the dial 10 toward the shift-range changing side is relatively large. Accordingly, any unexpected vehicle's move (forward traveling or backward traveling) which may be caused by the driver's erroneous shift-range changing can be restrained by making the driver properly recognize that the current operational direction is the one for changing the shift range, and also it can be prevented surely that the shift range is changed inadvertently which may caused by an unexpected force being applied to the operational member because of inadvertent touching of something or the like.

Figure 16A:
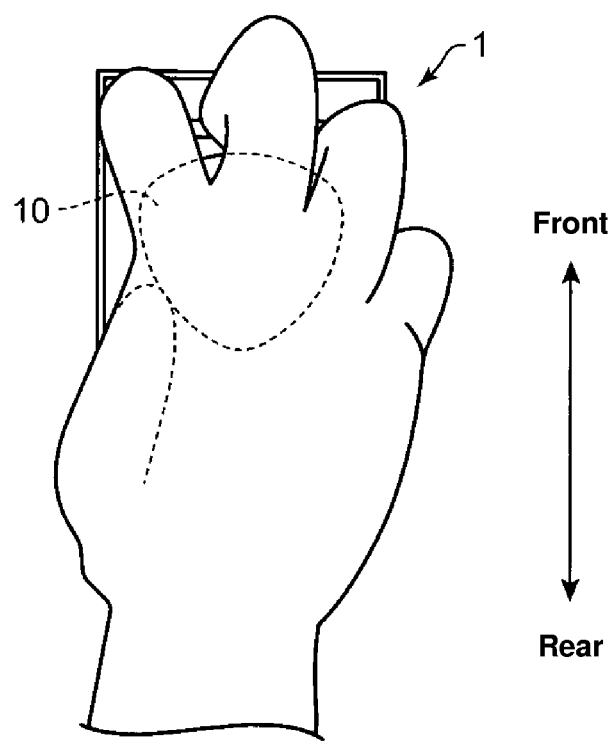
FIGS. 16A and 16B are diagrams showing a hand in different states.
Figure 16B:
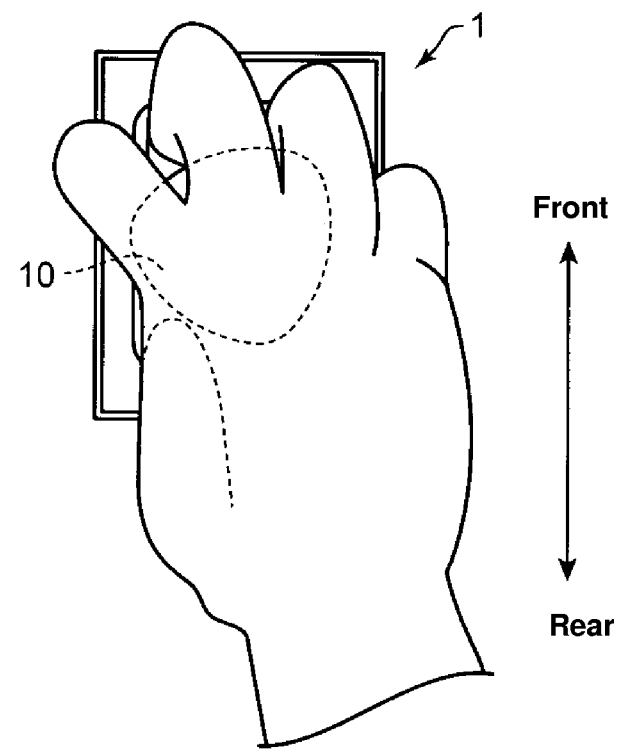

Moreover, by configuring the present embodiment such that the dial 10 is arranged on the right side of the driver and the rotational direction of the dial 10 for changing the shift range is set to be the counterclockwise direction, the operation for changing the shift range becomes relatively difficult, so that any unexpected shift-range changing can be prevented more surely. Specifically, as shown in FIG. 16A, in the state in which the dial 10 is arranged on the right side of the driver, the driver generally operates the dial 10 with the right hand. Herein, when the dial 10 arranged on the right side is rotated counterclockwise by the driver's right hand, the driver rotates the right hand toward the driver's body as shown in FIG. 16B. Herein, a movable range of a joint of the driver's wrist in the case of rotating the hand toward the body is smaller than that in a case of rotating the hand in the opposite direction. Specifically, it is generally said that the movable range of the joint of the wrist in the case of rotation toward the body (inward) is about 0-25 degrees, whereas that in the case of rotation in the opposite direction (outward) is about 0-55 degrees. Accordingly, in the above-described arrangement of the dial 10, it is relatively difficult to rotate the dial 10 counterclockwise, so that the operation for changing the shift range becomes relatively difficult.

Further, by configuring described above, the operational force necessary for changing the shift mode is relatively small and the rotation of the wrist of the hand for changing the shift mode is relatively easy. Thereby, the operation of changing the shift mode during the vehicle traveling or the like can be easier, so that the operability can be improved.

In particular, in a case like the present embodiment in which the sport mode configured to provide the high traveling performance and the economy mode configured to provide the high fuel-economy performance are set as the shift mode, it may be considered that the shift mode is changed relatively frequently according to the road conditions (traffic situations, traveling areas, etc.). Therefore, if the shift-mode changing operation is made easier in this kind of case, the driver can have better operational feelings.

Also, the present shift control device is configured such that the shift range is changed to the reverse range and also the shift mode is changed to the sport mode having the large gear ratio by sliding the dial 10 forward after the dial 10 is rotated, thereby matching the directions of changing the range and the mode match with the driver's feelings. Thereby, the driver can be provided with the better feelings.

Specifically, a conventional automatic-transmission vehicle is configured such that a shift-lever position corresponding to the reverse range is arranged forward of a shift-lever position corresponding to the drive range. Therefore, the above-described setting of the operational direction of changing to the reverse range to be the forward direction matches the conventional arrangement, so that the driver can conduct the shift changing to the reverse range and the drive range smoothly without having inappropriate feelings. Meanwhile, when the shift mode is changed to a mode having a large speed-reduction ratio during vehicle traveling, the vehicle tends to decelerate, so that a forward force acts on the driver. Therefore, the above-described setting of the operational direction of changing to the sport mode having the large speed-reduction ratio to be the forward direction can match the operational direction with the driver's feelings.

Further, the shift control device of the present embodiment is configured such that the change to the drive range or the reverse range can be attained only when the dial 10 is rotated and then further slid longitudinally, so that it can be properly restrained that the shift range is inadvertently changed to the drive range or the reverse range. Thereby, the safety of the vehicle can be improved.

Specifically, according to the shift control device of the present embodiment, even if an unexpected force is applied to the dial 10 because of inadvertent touching of a hand with the dial 10 or the like, the changing of the shift range is attained only when the magnitude of the applied force and the application position of the force are equal to the ones necessary to provide the dial 10 with an effective rotational torque. Thereby, any unexpected changing of the shift range can be restrained surely. For example, if a device in which the shift range is changed by the driver sliding the operational member is used, the operational member is slid and thereby the shift range is changed as long as a specified force for sliding the operational member is applied to any portion of the operational member. By contrast, according to the shift control device of the present embodiment, even when a specified force is applied to the dial 10, any rotation of the dial 10 can be properly prevented in a case in which the application position of the force is too close to the rotational center O of the dial 10.

Moreover, even if the dial 10 is rotated inadvertently, the shift range is changed only to the neutral range and also the shift range is not changed to the traveling range (the drive range, the reverse range) unless the dial 10 is further moved in the longitudinal direction after this rotation, so that any unexpected forward or backward traveling of the vehicle can be restrained in the present invention.

Herein, while the above-described embodiment describes the case in which the shift change is changed to the neutral range only by rotating the dial 10, the changing to the neutral range may be attained by a different operation. Further, the normal mode may be omitted from the above-described embodiment. That is, only two modes may be set as the shift mode so that the shift mode can be changed to either one of these two modes by sliding the dial 10 after the dial 10 is rotated.

Further, the above-described embodiment describes the case in which the operational direction of the dial 10 for changing the shift range is set to be the clockwise direction and the operational direction of the dial 10 for changing the shift mode is set to be the counterclockwise direction, considering that the counterclockwise rotation of the dial 10 arranged on the right side of the driver is more difficult than the clockwise rotation of the dial 10 arranged on the right side of the driver. However, in the case in which the dial 10 is arranged on the left side of the driver, the movable range of the joint becomes so narrow that the clockwise rotation of the dial 10 from the home position is relatively difficult. Therefore, it is preferable, in the case in which the dial 10 is arranged on the left side of the driver, that the operational direction of the dial 10 for changing the shift range be set to be the clockwise direction and the operational direction of the dial 10 for changing the shift mode be set to be the counterclockwise direction, so that the changing of the shift range cannot be attained easily.

Moreover, while the above-described embodiment describes the case in which the move direction of the dial 10 for changing to the reverse range and the move direction of the dial 10 for changing to the mode having the gear ratio are set to be the forward direction, these or either one of these may be set to be the rearward direction. However, since the operational direction can be matched with the driver's feelings by setting the operational direction to be the forward direction as described above, the better operational feelings can be obtained.

Also, while the above-described embodiment describes the case in which the operational force necessary to rotate the dial 10 for changing the shift range is larger than the operational force necessary to rotate the dial 10 for changing the shift mode, these operational forces may be set to be equal.

However, by configuring that these operational forces are different from each other as described above, the diver can be made to easily recognize whether the current operation changes the shift rage or the shift mode, so that any erroneous operation can be prevented.

Further, the operational force necessary to rotate the dial 10 for changing the shift range may be configured to be smaller than the operational force necessary to rotate the dial 10 for changing the shift mode. For example, in a case in which a specified mode in which the changing frequency is relatively small during the vehicle traveling is set as the shift mode, the above-described configuration can make the shift-range changing easier, so that the operability can be improved. Specifically, in a case in which a mode (a so-called snow mode where the vehicle starts with a second gear) in which the gear ratio is fixed to one that is smaller than the maximum gear ratio in order to restrain any tire spin at the vehicle starting is set as the shift mode, the timing of changing to this mode will be almost only the time when the vehicle starts. Accordingly, in this case, the operability can be improved by configuring that the operational force for changing the shift mode is relatively large but the operational force for changing the shift range is relatively small. Also, even in a vehicle or the like in which the shift-mode changing is executed primarily according to the presence of traction or the amount of loading (when the vehicle pulls something or the amount of loading is large, a mode having a large gear ration is selected), it is considered that the changing frequency of the shift mode is smaller than that of the shift range. Therefore, this kind of vehicle may be configured such that the operational force for changing the shift mode is relatively large but the operational force for changing the shift range is relatively small in order to ensure the operability.

Any other kinds of mode than the sport mode and the economy mode are applicable.

The specific constitution of the dial 10 is not to be limited to the above-described one.

While the above-described embodiments exemplified the case in which the dial 10 has the rotational angle of 15°, the specific angle is not to be limited to the angle of 15°. However, it is preferable that this angle be set to be 90° or smaller for the easy rotational operation.

Moreover, while the above-described embodiments are configured such that the operational forces necessary to rotate the dial 10 are differentiated for each rotational direction by differentiating the shapes of the rotational-side guide faces 24*a* in the clockwise direction and the counterclockwise direction, the specific constitution for differentiating the operational forces in the rotational direction is not be limited to this. However, this is superior in changing the operational force by properly utilizing the rotational-side guide faces 24*a* which function as part of the momentary mechanism, so that the structure can be properly simple.

Additionally, while the shift control device of the above-described embodiments is the device to change the shift range of the multi-stage automatic transmission 90 provided between the engine (internal combustion engine) and the wheels, an applicable transmission of the present invention is not limited to a multi-stage automatic transmission, but to a continuously variable transmission (CVT), for example. Further, the present invention can be applied to any transmission in which a forward-traveling range and a backward-traveling range are electrically changed, like a transmission used in electric automotive vehicles.

What is claimed is:

1. A shift control device for a vehicle, comprising:
   a shift device comprising an operational member provided in a vehicle compartment and a body portion supporting the operational member rotatably from a specified home position and movably in a vehicle longitudinal direction from a rotated position after the operational member is rotated, the body portion being configured to allow the rotated or moved operational member to return to the specified home position automatically;
   a sensor to detect rotation and move of the operational member of the shift device; and
   a controller comprising a determination portion to determine a state of the rotation and the move of the operational member detected by the sensor, a range change portion to supply signals for changing a shift range of the vehicle between a drive range for forward traveling and a reverse range for backward traveling to an automatic transmission based on determination results of the determination portion, and a mode change portion to supply signals for changing a shift mode of the vehicle between a first mode and a second mode having a gear ratio which is smaller than that of the first mode to the automatic transmission based on the determination results of the determination portion,
   wherein the range change portion of said controller is configured to supply a signal for changing the shift range to either one of the drive range and the reverse range to the automatic transmission when said determination portion determines that the operational member is moved forward from the rotated position after the operational member is rotated in a specified direction from the home position, and supply a signal for changing the shift range to the other of the drive range and the reverse range to the automatic transmission when the determination portion determines that the operational member is moved rearward from the rotated position after the operational member is rotated in the specified direction from the home position, and
   the mode change portion of said controller is configured to supply a signal for changing the shift mode to either one of the first mode and the second mode to the automatic transmission when said determination portion determines that the operational member is moved forward from the rotated position after the operational member is rotated in an opposite direction to the specified direction from the home position, and supply a signal for changing the shift mode to the other of the first mode and the second mode to the automatic transmission when the determination portion determines that the operational member is moved rearward from the rotated position after the operational member is rotated in the opposite direction to the specified direction from the home position.

2. The shift control device for the vehicle of claim 1, wherein said range change portion of the controller is configured to supply a signal for changing the shift range to a neutral range to the automatic transmission when said determination portion determines that the operational member is rotated in said specified direction from the home position.

3. The shift control device for the vehicle of claim 2, wherein said mode change portion of the controller is configured to supply a signal for changing the shift mode to a third mode having a gear ratio which is smaller than that of the first mode and larger than that of the second mode to the automatic transmission when said determination portion determines that the operational member is rotated in an opposite direction to said specified direction from the home position.

4. The shift control device for the vehicle of claim 1, wherein said operational member of the shift device is arranged on a right side of a driver seated in a driver's seat, and said specified direction is set to be a counterclockwise direction.

5. The shift control device for the vehicle of claim 1, wherein said operational member of the shift device is arranged on a left side of a driver seated in a driver's seat, and said specified direction is set to be a clockwise direction.

6. The shift control device for the vehicle of claim 1, wherein said range change portion of the controller is configured to supply a signal for changing the shift range to the reverse range to the automatic transmission when said determination portion determines that the operational member is moved forward from the rotated position after the operational member is rotated, and supply a signal for changing the shift range to the drive range to the automatic transmission when the determination portion determines that the operational member is moved rearward from the rotated position after the operational member is rotated.

7. The shift control device for the vehicle of claim 6, wherein said mode change portion of the controller is configured to supply a signal for changing the shift mode to the first mode when said determination portion determines that the operational member is forward from the rotated position after the operational member is rotated, and supply a signal for changing the shift mode to the second mode to the automatic transmission when the determination portion determines that the operational member is moved rearward from the rotated position after the operational member is rotated.

8. The shift control device for the vehicle of claim 1, wherein said body portion of the shift device is configured to support the operational member such that an operational force necessary for the operational member to be rotated in said specified direction from the home portion is larger than an operational force necessary for the operational member to be rotated in the opposite direction to said specified direction from the home position.

9. The shift control device for the vehicle of claim 1, wherein said body portion of the shift device is configured to support the operational member such that an operational force necessary for the operational member to be rotated in said specified direction from the home portion is smaller than an operational force necessary for the operational member to be rotated in the opposite direction to said specified direction from the home position.

10. A shift control device for a vehicle, comprising:
a shift device comprising an operational member provided in a vehicle compartment and a body portion supporting the operational member rotatably from a specified home position and movably in a vehicle longitudinal direction from a rotated position after the operational member is rotated, the body portion being configured to allow the rotated or moved operational member to return to the specified home position automatically;
a sensor to detect rotation and move of the operational member of the shift device; and
a controller comprising a determination portion to determine a state of the rotation and the move of the operational member detected by the sensor, a range change portion to supply signals for changing a shift range of the vehicle between a drive range for forward traveling and a reverse range for backward traveling to an automatic transmission based on determination results of the determination portion, and a mode change portion to supply signals for changing a shift mode of the vehicle between a first mode and a second mode having a gear ratio which is smaller than that of the first mode to the automatic transmission based on the determination results of the determination portion,
wherein the range change portion of said controller is configured to supply a signal for changing the shift range to either one of the drive range and the reverse range to the automatic transmission when said determination portion determines that the operational member is moved forward from the rotated position after the operational member is rotated in a specified direction from the home position, and supply a signal for changing the shift range to the other of the drive range and the reverse range to the automatic transmission when the determination portion determines that the operational member is moved rearward from the rotated position after the operational member is rotated in the specified direction from the home position, and
the mode change portion of said controller is configured to supply a signal for changing the shift mode to either one of the first mode and the second mode to the automatic transmission when said determination portion determines that the operational member is moved forward from the rotated position after the operational member is rotated in an opposite direction to the specified direction from the home position, and supply a signal for changing the shift mode to the other of the first mode and the second mode to the automatic transmission when the determination portion determines that the operational member is moved rearward from the rotated position after the operational member is rotated in the opposite direction to the specified direction from the home position, and
wherein said range change portion of the controller is configured to supply a signal for changing the shift range to a neutral range to the automatic transmission when said determination portion determines that the operational member is rotated in said specified direction from the home position, supply a signal for changing the shift range to the reverse range to the automatic transmission when said determination portion determines that the operational member is moved forward from the rotated position after the operational member is rotated, and supply a signal for changing the shift range to the drive range to the automatic transmission when the determination portion determines that the operational member is moved rearward from the rotated position after the operational member is rotated.

11. The shift control device for the vehicle of claim 10, wherein said mode change portion of the controller is configured to supply a signal for changing the shift mode to a third mode having a gear ratio which is smaller than that of the first mode and larger than that of the second mode to the automatic transmission when said determination portion determines that the operational member is rotated in an opposite direction to said specified direction from the home position.

12. The shift control device for the vehicle of claim 10, wherein said mode change portion of the controller is configured to supply a signal for changing the shift mode to the first mode when said determination portion determines that the operational member is forward from the rotated position after the operational member is rotated, and supply a signal for changing the shift mode to the second mode to the automatic transmission when the determination portion determines that the operational member is moved rearward from the rotated position after the operational member is rotated.

13. The shift control device for the vehicle of claim 10, wherein said operational member of the shift device is arranged on a right side of a driver seated in a driver's seat, and said specified direction is set to be a counterclockwise direction.

14. The shift control device for the vehicle of claim 10, wherein said operational member of the shift device is arranged on a left side of a driver seated in a driver's seat, and said specified direction is set to be a clockwise direction.

15. The shift control device for the vehicle of claim 10, wherein said body portion of the shift device is configured to support the operational member such that an operational force necessary for the operational member to be rotated in said specified direction from the home portion is larger than an operational force necessary for the operational member to be rotated in the opposite direction to said specified direction from the home position.

16. The shift control device for the vehicle of claim 10, wherein said body portion of the shift device is configured to support the operational member such that an operational force necessary for the operational member to be rotated in said specified direction from the home portion is smaller than an operational force necessary for the operational member to be rotated in the opposite direction to said specified direction from the home position.

17. A shift control device for a vehicle, comprising:
a shift device comprising an operational member provided in a vehicle compartment and a body portion supporting the operational member rotatably from a specified home position and movably in a vehicle longitudinal direction from a rotated position after the operational member is rotated, the body portion being configured to allow the rotated or moved operational member to return to the specified home position automatically;
a sensor to detect rotation and move of the operational member of the shift device; and
a controller comprising a determination portion to determine a state of the rotation and the move of the operational member detected by the sensor, a range change portion to supply signals for changing a shift range of the vehicle between a drive range for forward traveling and a reverse range for backward traveling to an automatic transmission based on determination results of the determination portion, and a mode change portion to supply signals for changing a shift mode of the vehicle between a first mode and a second mode having a gear ratio which is smaller than that of the first mode to the automatic transmission based on the determination results of the determination portion,
wherein the range change portion of said controller is configured to supply a signal for changing the shift range to either one of the drive range and the reverse range to the automatic transmission when said determination portion determines that the operational member is moved forward from the rotated position after the operational member is rotated in a specified direction from the home position, and supply a signal for changing the shift range to the other of the drive range and the reverse range to the automatic transmission when the determination portion determines that the operational member is moved rearward from the rotated position after the operational member is rotated in the specified direction from the home position, and
the mode change portion of said controller is configured to supply a signal for changing the shift mode to either one of the first mode and the second mode to the automatic transmission when said determination portion determines that the operational member is moved forward from the rotated position after the operational member is rotated in an opposite direction to the specified direction from the home position, and supply a signal for changing the shift mode to the other of the first mode and the second mode to the automatic transmission when the determination portion determines that the operational member is moved rearward from the rotated position after the operational member is rotated in the opposite direction to the specified direction from the home position, and
wherein said mode change portion of the controller is configured to supply a signal for changing the shift mode to a third mode having a gear ratio which is smaller than that of the first mode and larger than that of the second mode to the automatic transmission when said determination portion determines that the operational member is rotated in an opposite direction to said specified direction from the home position, supply a signal for changing the shift mode to the first mode when said determination portion determines that the operational member is forward from the rotated position after the operational member is rotated, and supply a signal for changing the shift mode to the second mode to the automatic transmission when the determination portion determines that the operational member is moved rearward from the rotated position after the operational member is rotated.

18. The shift control device for the vehicle of claim 17, wherein said range change portion of the controller is configured to supply a signal for changing the shift range to a neutral range to the automatic transmission when said determination portion determines that the operational member is rotated in said specified direction from the home position.

19. The shift control device for the vehicle of claim 17, wherein said range change portion of the controller is configured to supply a signal for changing the shift range to the reverse range to the automatic transmission when said determination portion determines that the operational member is moved forward from the rotated position after the operational member is rotated, and supply a signal for changing the shift range to the drive range to the automatic transmission when the determination portion determines that the operational member is moved rearward from the rotated position after the operational member is rotated.

* * * * *